US010726275B2

(12) United States Patent
Pfeifle et al.

(10) Patent No.: US 10,726,275 B2
(45) Date of Patent: Jul. 28, 2020

(54) SYSTEM AND METHOD FOR CORRELATING VEHICULAR SENSOR DATA

(71) Applicant: VISTEON GLOBAL TECHNOLOGIES, INC., Van Buren Township, MI (US)

(72) Inventors: Martin Pfeifle, Seewald (DE); Markus Schupfner, Erlangen (DE); Matthias Schulze, Muhlacker (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 136 days.

(21) Appl. No.: 15/914,503

(22) Filed: Mar. 7, 2018

(65) Prior Publication Data

US 2019/0279000 A1    Sep. 12, 2019

(51) Int. Cl.
*G06K 9/00* (2006.01)
*G08G 1/16* (2006.01)
*G06K 9/62* (2006.01)

(52) U.S. Cl.
CPC ....... *G06K 9/00791* (2013.01); *G06K 9/6215* (2013.01); *G06K 9/6276* (2013.01); *G06K 9/6289* (2013.01); *G08G 1/166* (2013.01)

(58) Field of Classification Search
CPC ............. G06K 9/00791; G06K 9/6215; G06K 9/6276; G06K 9/6289; G08G 1/166
See application file for complete search history.

(56) References Cited

U.S. PATENT DOCUMENTS

| 10,156,850 | B1* | 12/2018 | Ansari | G08G 1/166 |
| 10,268,950 | B2* | 4/2019 | Yin | G06N 3/08 |
| 2009/0187960 | A1* | 7/2009 | Lee | H04N 7/17318 |
| | | | | 725/131 |
| 2010/0254595 | A1* | 10/2010 | Miyamoto | G06K 9/2036 |
| | | | | 382/159 |
| 2013/0223686 | A1* | 8/2013 | Shimizu | G08G 1/166 |
| | | | | 382/103 |
| 2014/0136414 | A1* | 5/2014 | Abhyanker | G06Q 50/28 |
| | | | | 705/44 |

(Continued)

OTHER PUBLICATIONS

Google Scholar Search Results.*

*Primary Examiner* — Qun Shen
(74) *Attorney, Agent, or Firm* — Dickinson Wright PLLC

(57) ABSTRACT

A system for correlating sensor data in a vehicle includes a first sensor disposed on the vehicle to detect a plurality of first objects. A first object identification controller analyzes the first data stream, identifies the first objects, and determines first characteristics associated therewith. A second sensor disposed on the vehicle detects a plurality of second objects. A second object identification controller analyzes the second data stream, identifies the second objects, and determines second characteristics associated therewith. A model generator includes a plausibility voter to generate an environmental model of the objects existing in space around the vehicle. The model generator may use ASIL decomposition to provide a higher ASIL level than that of any of the sensors or object identification controllers alone. Matchings between uncertain objects are accommodated using matching distance probability functions and a distance-probability voter. A method of operation is also provided.

20 Claims, 18 Drawing Sheets

(56) References Cited

U.S. PATENT DOCUMENTS

| | | | |
|---|---|---|---|
| 2014/0142799 A1* | 5/2014 | Ferguson | B60W 30/12 |
| | | | 701/23 |
| 2014/0294231 A1* | 10/2014 | Datta | G06T 7/251 |
| | | | 382/103 |
| 2016/0259043 A1* | 9/2016 | Schar | G01S 13/723 |
| 2016/0275376 A1* | 9/2016 | Kant | G06K 9/6277 |
| 2018/0082404 A1* | 3/2018 | Adsumilli | G06T 7/248 |
| 2018/0372499 A1* | 12/2018 | Ali | G01C 21/165 |
| 2019/0049958 A1* | 2/2019 | Liu | G01S 7/40 |

* cited by examiner

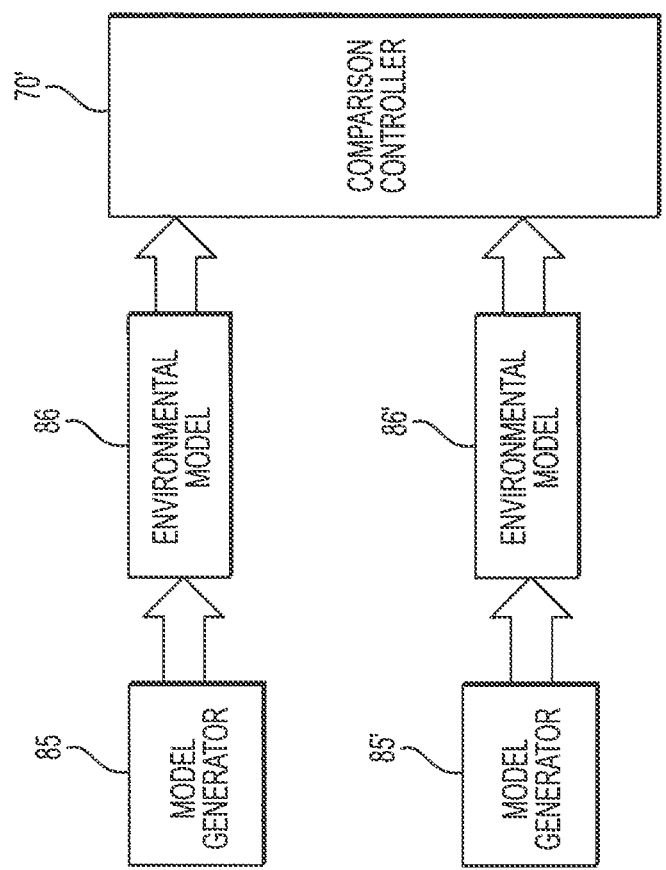
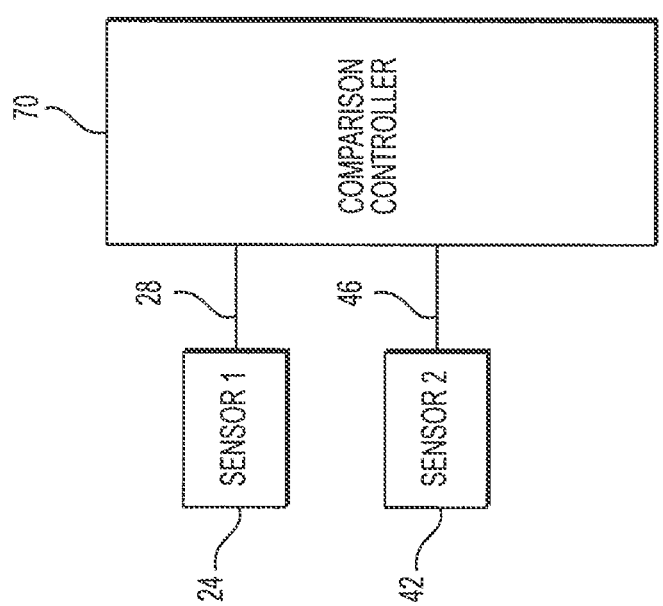
FIG. 6B
FIG. 6A

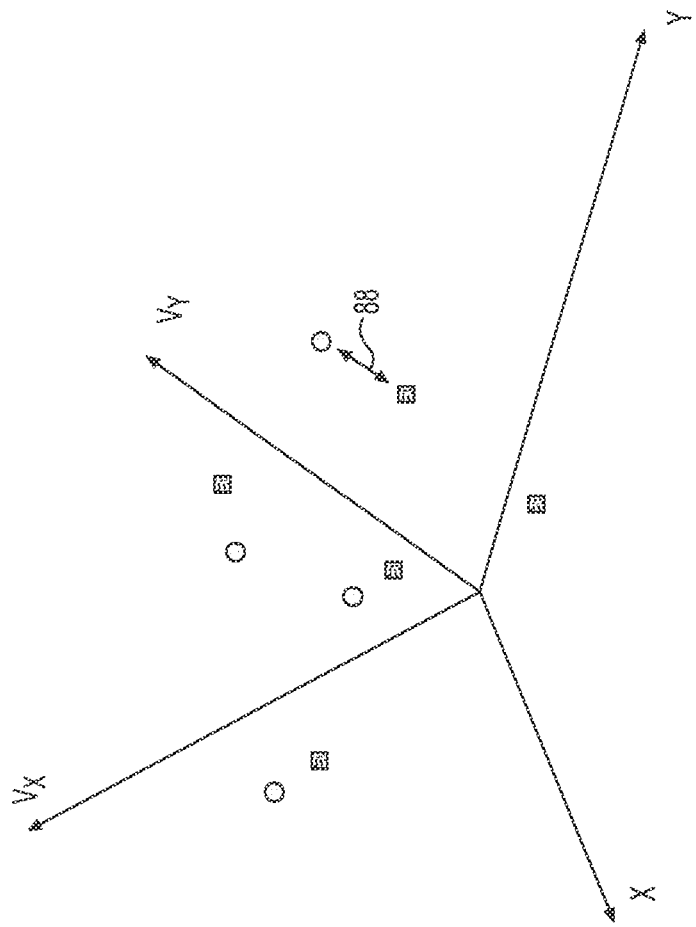
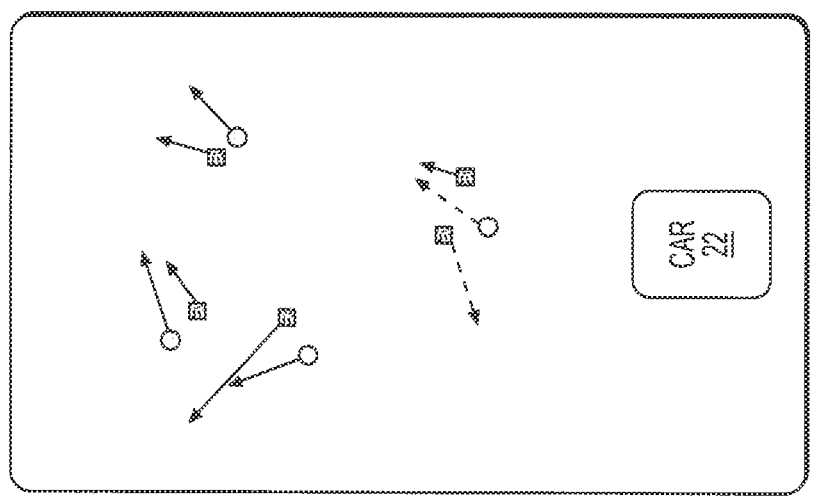
FIG. 7B
FIG. 7A

87 —▦— UNCERTAIN OBJECTS OF FIRST ENV. MODEL (86)
87' —○— UNCERTAIN OBJECTS OF SECOND ENV. MODEL (86')

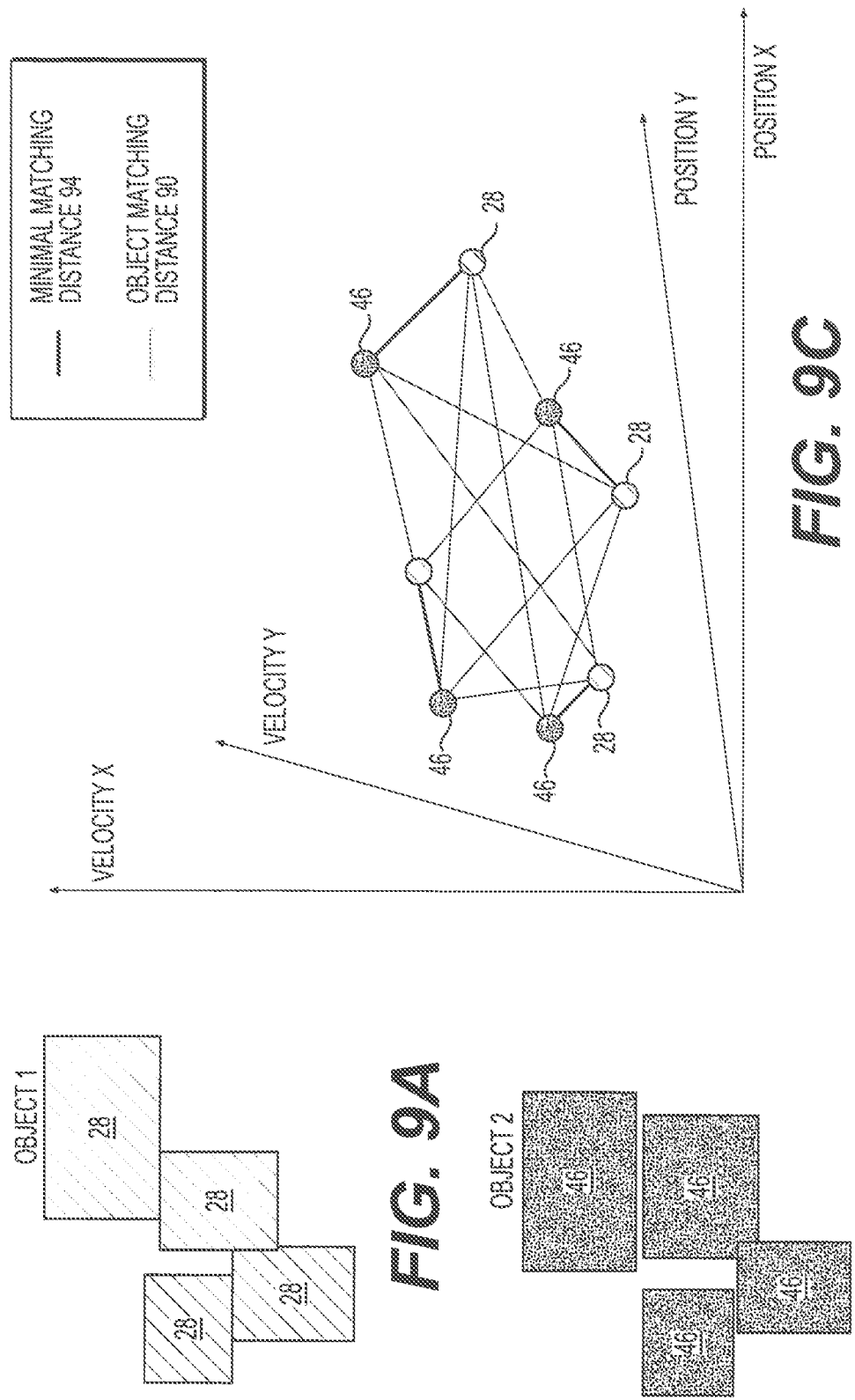

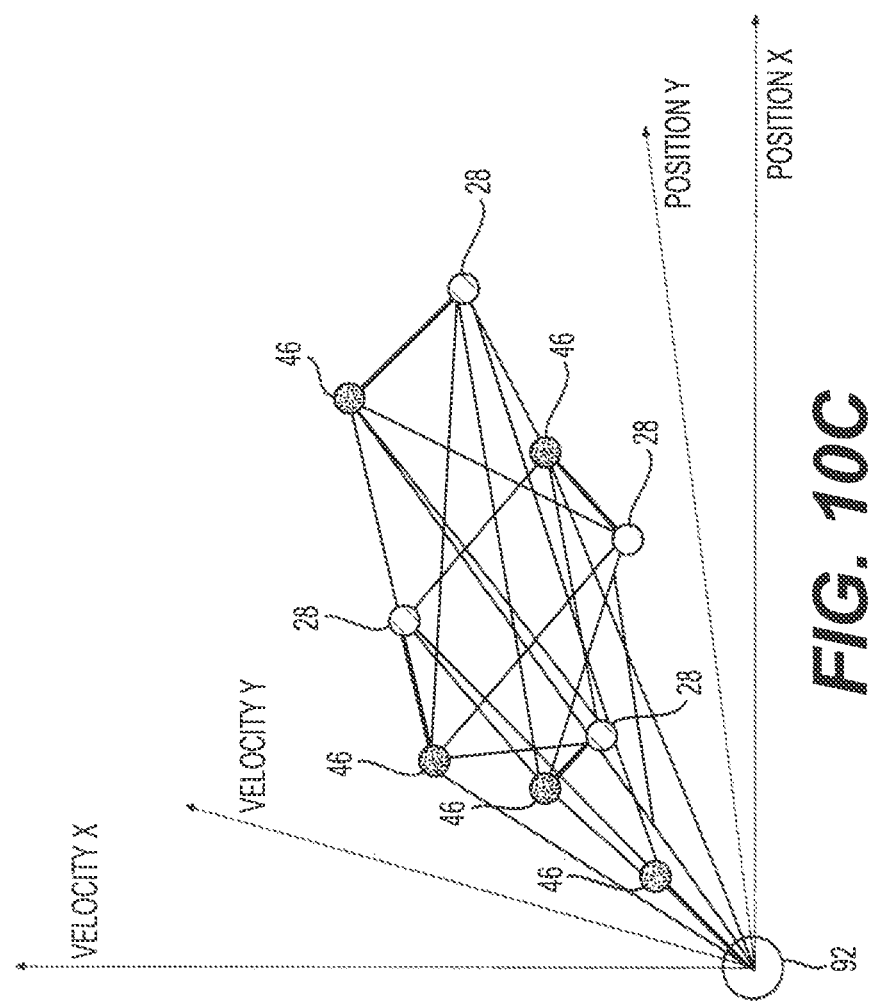
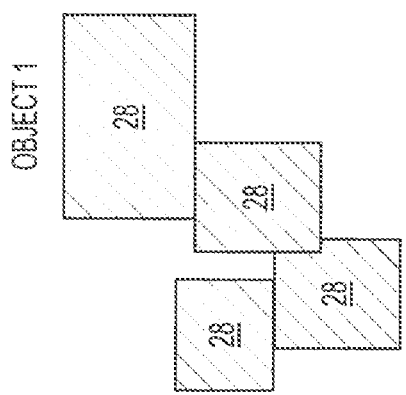
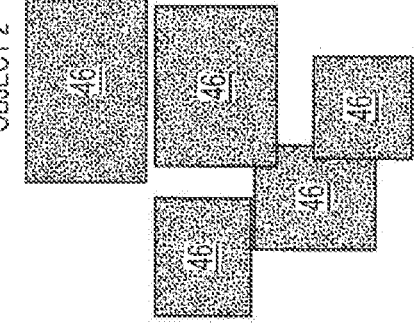
FIG. 10C
FIG. 10A
FIG. 10B

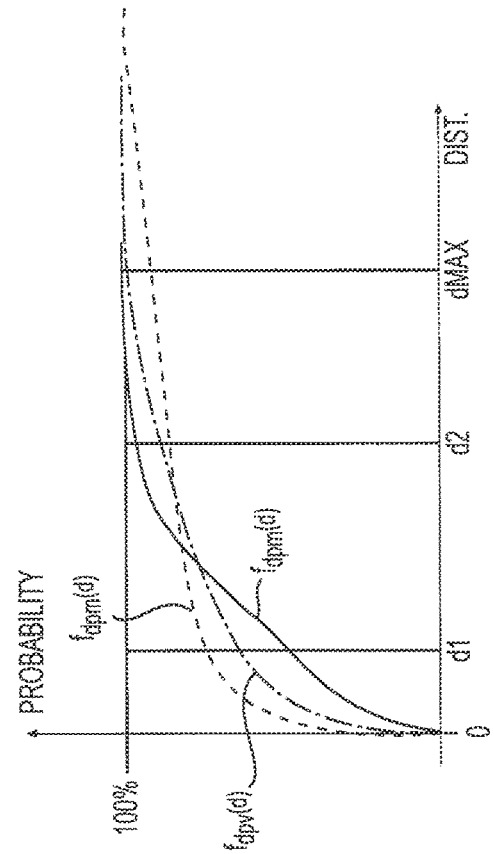
FIG. 13B
FIG. 13C
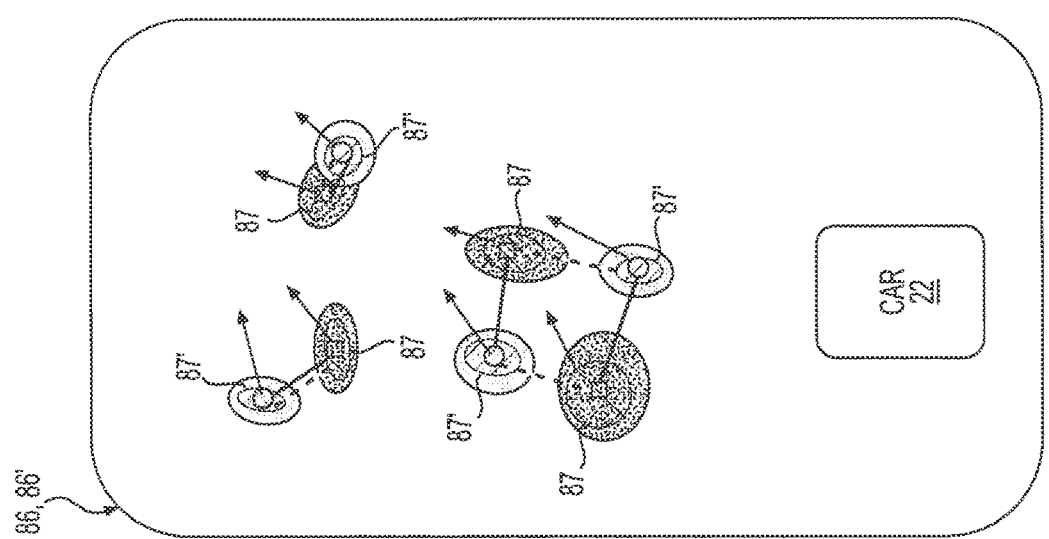
FIG. 13A

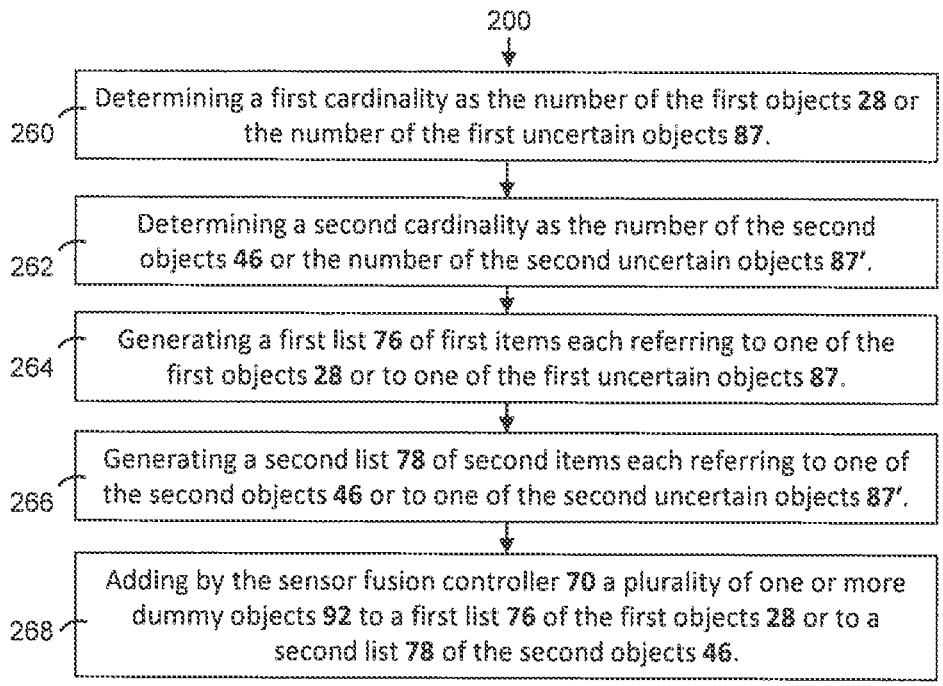

FIG. 18

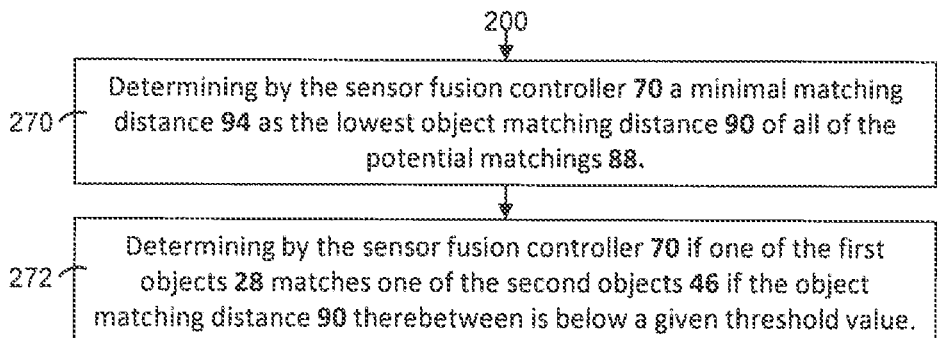

FIG. 19

Selecting, by a plausibility voter 84, the best 2 out of 3 of the objects 28, 46, 60 from the object identification controllers 34, 52, 66 as the ones of the objects 28, 46, 60 having the lowest of the object matching distances 90 or the ones of the objects 28, 46, 60 whose matching distance probability function $f_{dpm}(d)$ has the highest value for a given distance value d or for a plurality of distance values d between given upper and lower limits.

SYSTEM AND METHOD FOR CORRELATING VEHICULAR SENSOR DATA

BACKGROUND

Lately, highly automated driving (HAD) has become more and more important and has received the attention of many players in the automotive industry as well as that of many scientists working on machine learning and robotics. An autonomous car (driverless car, self-driving car, robotic car) is a vehicle that is capable of sensing its environment and navigating without human input.

Autonomous cars can detect their surroundings using a variety of techniques and sensors such as radar, LIDAR, GPS, odometry, and computer vision. Advanced control systems interpret sensory information to identify appropriate navigation paths, as well as obstacles and relevant signage. Autonomous cars have control systems that are capable of analyzing sensory data to distinguish between different vehicles on the road, which is very useful in planning a path to the desired destination.

HAD applications are using various sensors, e.g. cameras, lidar and radar systems, to perceive the environment of the vehicle. Based on the information provided by these sensors, all kinds of dynamic road users, e.g. cars, pedestrians and bicycles, as well as static objects such as signs, road markings, etc. can be detected. To come to a highly reliable representation of the environment, the information from various sensors, e.g. lidars, cameras, and radars, needs to be combined or fused. The fused information leads to the environmental model which may be used as the main input for the decision-making process of a self-driving car. In addition, parts of this information will be shown to the driver to increase his or her trust in the capabilities of our self-driving car. Sensor fusion puts the information from the various sensors together and removes duplicates and wrong information while improving the quality of the correct information. Sensor fusion works on uncertain information represented by covariance matrices, and combines it into something more reliable, i.e. less uncertain, by using algorithms such as the Hungarian method and Kalman filter. By doing so, the quality of the information that is provided is improved and thus leads to less false positives and false negatives. A false positive might lead to an emergency braking although there is no reason for it, whereas a false negative might lead to an accident as a consequence of an object, such as another car, not being detected. Sensor fusion reduces the likelihood of these error situations.

Although currently many ADAS (advanced driver assistance) applications are based on traditional techniques using mainly computer vision algorithms, the new machine learning techniques, especially neural networks and variants of neural networks such as CNNs (convolutional neural networks) or RCNNs (region-based convolutional neural networks), are getting more and more important. In particular, RCNNs processing camera information are regarded as state-of-the-art systems for detecting, classifying and localizing dynamic and static road objects. The quality of the detection, classification and localization of objects heavily depends on many different factors, such as the underlying neural network structure or the training data used for training the parameters of the neural network. The training is a very time-consuming process which takes place offline on big servers and which requires labeled training data. Labeled training data consists of both the sensor data, e.g. camera image, and classification and localization information, e.g. bounding boxes around cars or pedestrians. After the training is completed, the neural network consisting of code and configuration data is then deployed to the HAD unit in the car. The neural network in the car allows for detection, classification and localization of static and dynamic road users from camera image streams in real time.

Functional safety is the part of the overall safety of a system or piece of equipment that depends on the system or equipment operating correctly in response to its inputs, including the safe management of likely operator errors, hardware failures and environmental changes. Titled "Road vehicles—Functional safety", ISO 26262 is an international standard for functional safety of electrical and/or electronic systems in production automobiles defined by the International Organization for Standardization (ISO) in 2011. It provides an automotive-specific, risk-based approach for determining risk classes (Automotive Safety Integrity Levels, ASILs). ASIL classifications are used within ISO 26262 to express the level of risk reduction required to prevent a specific hazard, with ASIL D representing the highest and ASIL A the lowest. In order to reach ASIL D within a system, it is possible to combine lower ASIL components and compare their results with a plausibility voter.

There exists a need for a system to accurately correlate sensor data in a vehicle and to generate a correlated model of the objects existing in space around the vehicle, and particularly to do so using uncertain information.

SUMMARY

A system for correlating sensor data in a vehicle includes a first sensor disposed on the vehicle to detect a plurality of first objects each having a plurality of first characteristics. The system also includes a second sensor disposed on the vehicle to detect a plurality of second objects, each having a plurality of second characteristics. The system also includes a first model generator combining the plurality of first objects with the plurality of second objects to generate a first environmental model containing a plurality of first uncertain objects, each having a probability density distribution of a characteristic thereof. A second model generator similarly generates a second environmental model, different than the first environmental model, and containing a plurality of second uncertain objects, each having a probability density distribution of a characteristic thereof.

The system also includes a comparison controller with a processor configured to determine a plurality of potential matchings between the plurality of first uncertain objects within the first environmental model, and the plurality of second uncertain objects within the second environmental model. The comparison controller is also configured to determine a matching distance probability function for each of the potential matchings.

The system may further include a first object identification controller having a first Automotive Safety Integrity Level and configured to identify the first objects and to determine the first characteristics associated therewith, and a second object identification controller configured to identify the second objects and to determine the second characteristics associated therewith. The comparison controller may have a second Automotive Safety Integrity Level greater than the first Automotive Safety Integrity Level of the object identification controllers, and the system may function at the second Automotive Safety Integrity Level. In other words, the system as a whole may employ ASIL decomposition to operate at a higher ASIL level than individual components thereof.

A method for correlating sensor data in a vehicle is also provided. The method includes the steps of detecting a plurality of first objects by a first sensor disposed on the vehicle, with each of the first objects having a plurality of first characteristics; and detecting a plurality of second objects by a second sensor disposed on the vehicle, with each of the second objects having a plurality of second characteristics. The method also includes generating a first environmental model including a plurality of first uncertain objects by a first model generator using the first objects and the second objects. The method also includes generating a second environmental model by a second model generator, with the second environmental model being different than the first environmental model and including a plurality of second uncertain objects.

The method continues with the step of determining a plurality of potential matchings between ones of the first uncertain objects in the first environmental model and ones of the second uncertain objects in the second environmental model. The method proceeds with the steps of determining an individual probabilistic distance function for each of the potential matchings. The method also includes determining an overall probabilistic distance function as the summation of all of the individual probabilistic distance functions; and determining a matching distance probability function corresponding to the overall probabilistic distance function for each of the potential matchings.

The method also includes providing a distance-probability voter having a given probability value associated with a range of distance values; and determining that the plurality of first uncertain objects are identical to the plurality of second uncertain objects if, for all distance values within a predetermined range of distance values, the matching distance probability function of at least one of the potential matchings is greater than the distance-probability voter.

BRIEF DESCRIPTION OF THE DRAWINGS

Further details, features and advantages of designs of the invention result from the following description of embodiment examples in reference to the associated drawings.

FIG. 6A is a block diagram illustrating a comparison controller taking two sets of objects from two different sensors as inputs;

FIG. 6B is a block diagram illustrating a comparison controller taking two environmental models as inputs;

FIG. 7A is a diagram of objects as high-dimensional feature vectors in space around a vehicle;

FIG. 7B is a diagram of the objects of FIG. 7A in a 4-dimensional coordinate space;

FIG. 9A is a perspective view of an example of first objects as detected by a first sensor, and having a first cardinality;

FIG. 9B is a perspective view of an example of second objects as detected by a second sensor and having the first cardinality;

FIG. 9C is a diagram of 4-dimensional space of points representing first and second objects of FIGS. 9A and 9B, with lines representing matching distances between points;

FIG. 10A is a perspective view of another example of first objects as detected by a first sensor, and having a first cardinality;

FIG. 10B is a perspective view of another example of second objects as detected by a second sensor and having a second cardinality different than the first cardinality;

FIG. 10C is a diagram of 4-dimensional space of points representing first and second objects of FIGS. 10A and 10B, with lines representing matching distances between points, and with a dummy object at the origin;

FIG. 13A is a diagram with two different possible matchings between uncertain objects of two environmental models as high-dimensional feature vectors in space around a vehicle;

FIG. 13B shows two overall probabilistic distance functions between the two different possible matchings between the uncertain objects of the two environmental models of FIG. 13A;

FIG. 13C shows a distance-probability voter and a matching distance probability functions for each of the two different possible matchings between the uncertain objects of the two environmental models of FIG. 13A;

FIG. 18 is a flow chart of additional steps of the method of FIG. 15;

FIG. 19 is a flow chart of additional steps of the method of FIG. 15; and

FIG. 20 is a flow chart of additional steps of the method of FIG. 15.

DETAILED DESCRIPTION

Referring to the Figures, wherein like numerals indicate corresponding parts throughout the several views, a system 20 for correlating sensor data in a vehicle 22 is disclosed.

Figure 1:
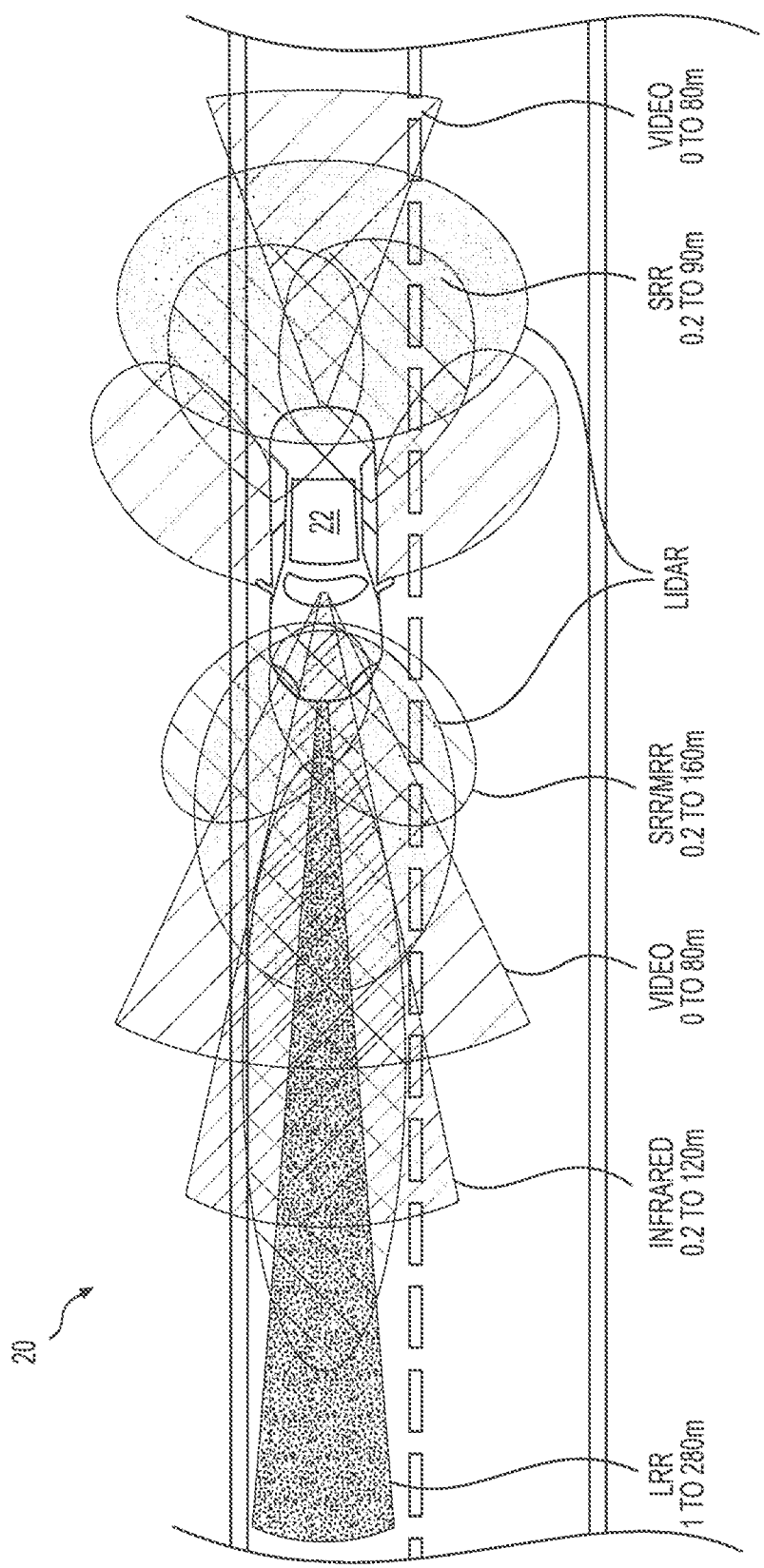
FIG. 1 is a top view of a vehicle showing the coverage of a plurality of different sensors.
Figure 2D:
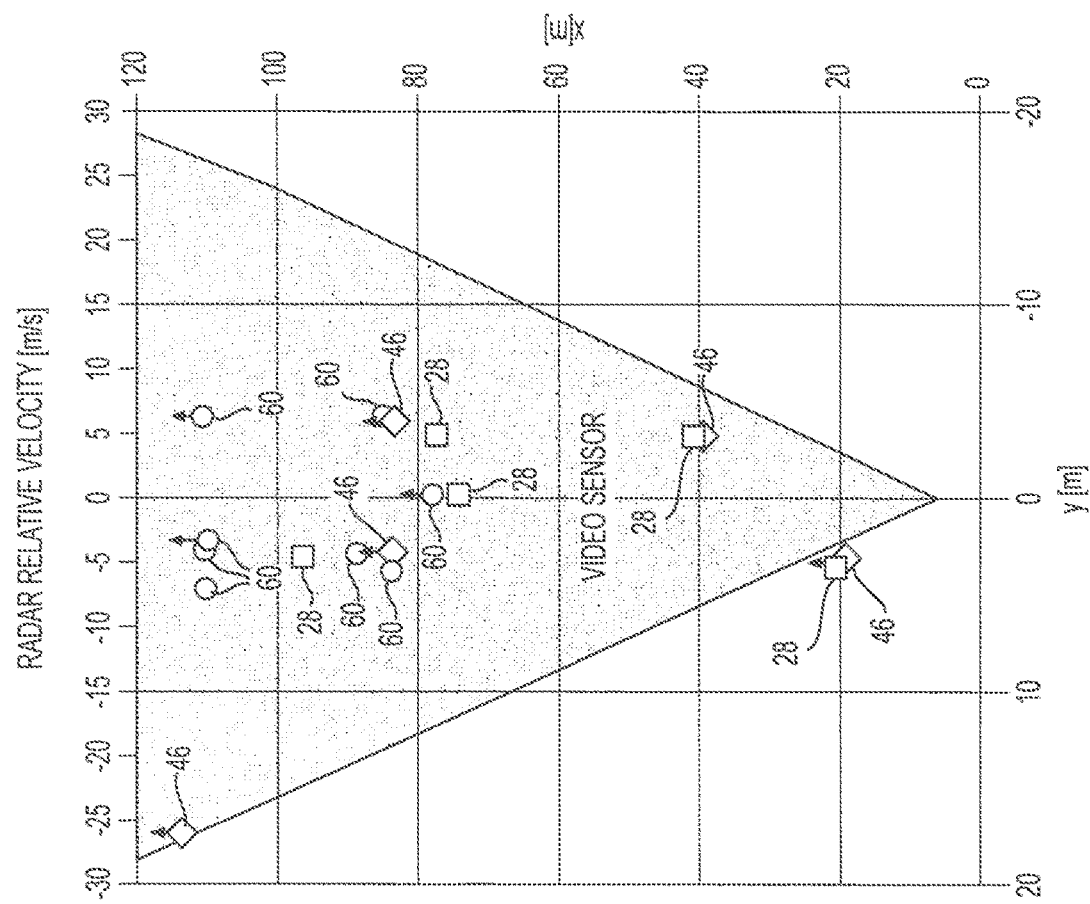
FIG. 2D is a schematic view of an environmental model of objects in space around a vehicle.
Figure 2A:
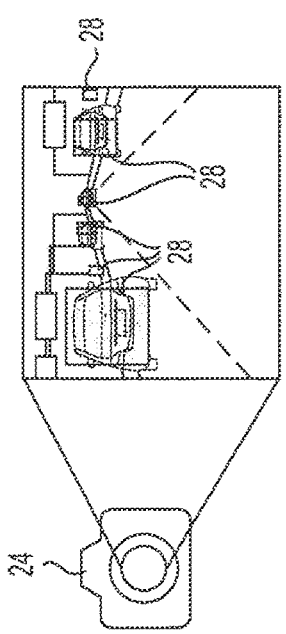
FIG. 2A is a view of first objects detected by a first sensor overlaid on a drawing of a road environment in front of a vehicle.
Figure 2B:
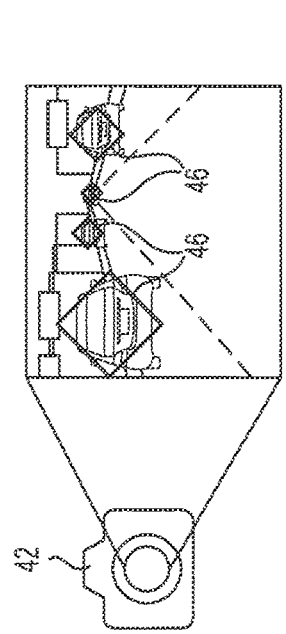
FIG. 2B is a view of second objects detected by a second sensor overlaid on a drawing of a road environment in front of a vehicle.
Figure 2C:
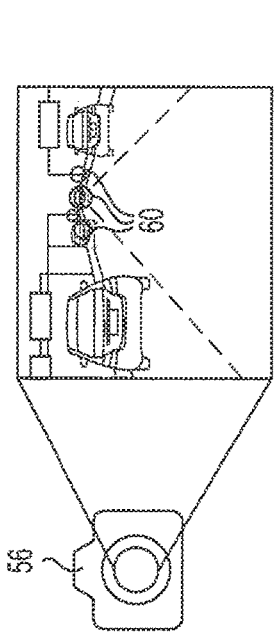
FIG. 2C is a view of third objects detected by a third sensor overlaid on a drawing of a road environment in front of a vehicle.

The system 20 includes a first sensor 24 disposed on the vehicle 22 generating a first data stream 26 and configured to detect a plurality of first objects 28 each having a plurality of first characteristics, which may include, for example, a first x position x in an x direction, a first y position y in a y direction orthogonal to the x direction, a first x velocity $v_x$ in the x direction, and a first y velocity $v_y$ in the y direction. The first characteristics may also include a first x angular size $\theta_x$ in the x direction, a first y angular size $\theta_y$ in the y direction, and/or other characteristics such as, for example, color, shape, and/or motion characteristics. As shown in FIG. 1, the first sensor 24 may be any of several different types of sensors including, for example, a long-range radar (LRR), a short to medium-range radar (SRR/MRR), a short-range radar (SRR) a LIDAR, a visible spectrum video or an infrared video. The number of the first objects 28 detected by the first sensor 24 may be called a "first cardinality".

Figure 5:
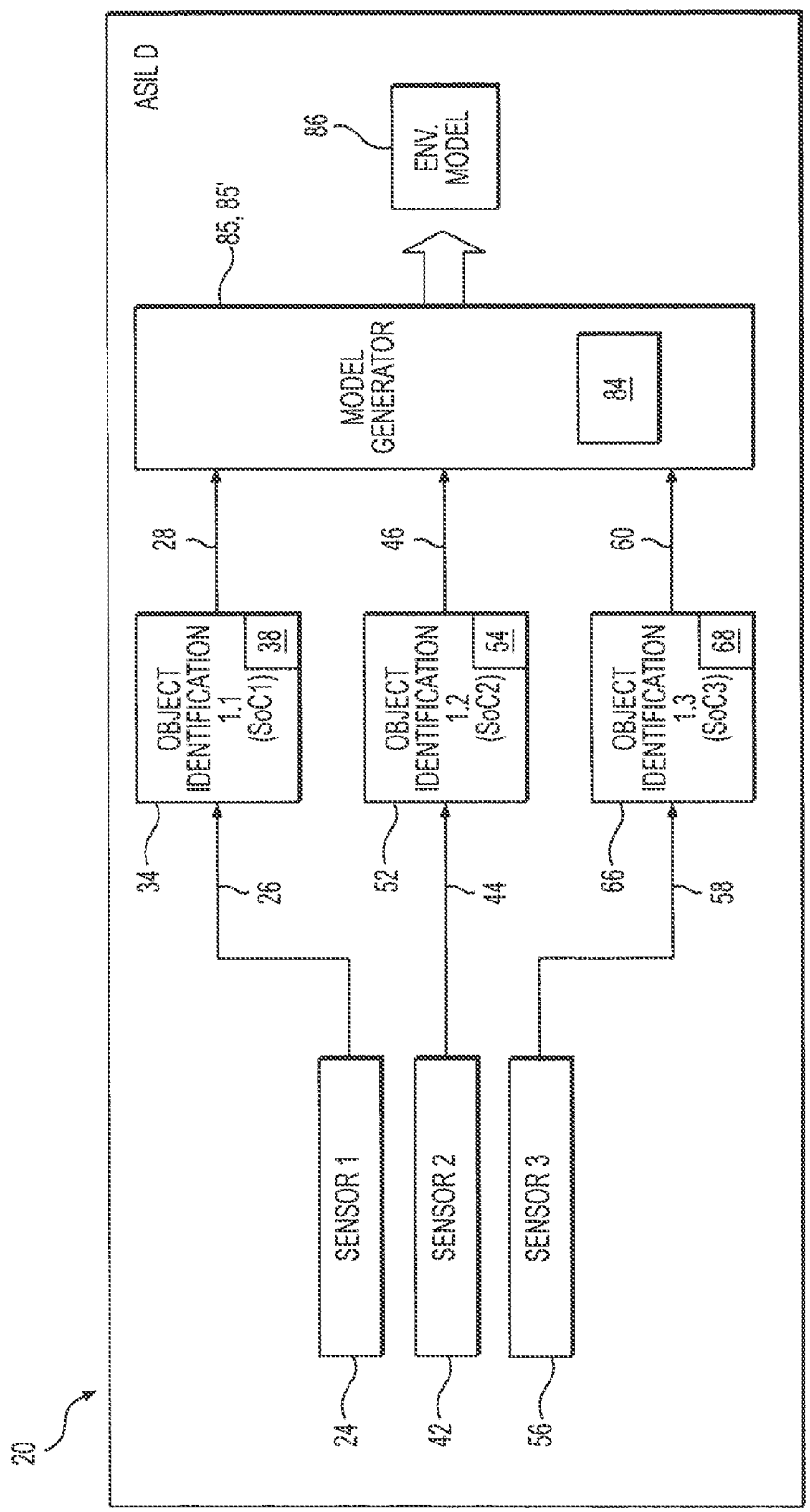
FIG. 5 is a block diagram illustrating generation of an environmental model using a model generator.

As shown in the block diagram of FIG. 5, the system 20 also includes a first object identification controller 34, which may be a System-on-a-Chip (SoC) device, and which may have a first Automotive Safety Integrity Level 36, such as ASIL B, associated therewith. The first object identification controller 34 includes a first object identification neural network 38 for analyzing the first data stream 26 and identifying the first objects 28 and determining the first characteristics associated therewith. The first object identification neural network 38 may be a convolutional neural network. More specifically, first object identification neural network 38 may be a region-based convolutional neural network.

The system 20 includes a second sensor 42 disposed on the vehicle 22, generating a second data stream 44 and configured to detect a plurality of second objects 46 each having a plurality of second characteristics, which may include, for example, a second x position x' in the x direction, a second y position y' in the y direction, a second x velocity $v_x'$ in the x direction, and a second y velocity $v_y'$ in the y direction. The second characteristics may also include a second x angular size $\theta_x'$ in the x direction, and a second y angular size $\theta_y'$ in the y direction, and/or other characteristics such as, for example, color, shape, and/or motion characteristics. As shown in FIG. 1, the second sensor 42 may be any of several different types of sensors including, for example, a long-range radar, a short to medium-range radar, a lidar, a visible spectrum video or an infrared video. The number of the second objects 46 detected by the second sensor 42 may be called a "second cardinality".

As shown in the block diagram of FIG. 5, the system 20 also includes a second object identification controller 52, which may be a System-on-a-Chip (SoC) device, and which may have the first Automotive Safety Integrity Level 36, associated therewith. The second object identification controller 52 includes a second object identification neural network 54 for analyzing the second data stream 44 and identifying the second objects 46 and determining the second characteristics associated therewith. The second object identification neural network 54 may be a convolutional neural network. More specifically, the second object identification neural network 54 may be a region-based convolutional neural network.

The system 20 includes a third sensor 56 disposed on the vehicle 22, generating a third data stream 58 and configured to detect a plurality of third objects 60 each having a plurality of third characteristics, which may include, for example, a third x position x" in the x direction, a third y position y" in the y direction, a third x velocity $v_x''$ in the x direction, and a third y velocity $v_y''$ in the y direction. The third characteristics may also include a third x angular size $\theta_x''$ in the x direction, and a third y angular size $\theta_y''$ in the y direction, and/or other characteristics such as, for example, color, shape, and/or motion characteristics. The number of the third objects 60 detected by the third sensor 56 may be called a "third cardinality".

As shown in the block diagram of FIG. 5, the system 20 also includes a third object identification controller 66, which may be a System-on-a-Chip (SoC) device, and which may have the first Automotive Safety Integrity Level 36 associated therewith. The third object identification controller 66 includes a third object identification neural network 68 for analyzing the third data stream 58 and identifying the third objects 60 and determining the third characteristics associated therewith. The third object identification neural network 68 may be a convolutional neural network. More specifically, the third object identification neural network 68 may be a region-based convolutional neural network.

As shown in the block diagram of FIG. 6A, a first comparison controller 70 directly compares the plurality of first objects 28 with the plurality of second objects 46 to correlate the data therebetween.

As best illustrated in FIGS. 11A-11D, the objects 28, 46, 60 can be regarded as a high-dimensional feature vector, i.e. a point in $IR^n$. An object can be as simple as a point in $IR2$, consisting only of two dimensions x and y. An object might also be represented by a five-dimensional feature vector consisting of characteristics with values for objType, x position x, y position y, x velocity $v_x$, y velocity $v_y$. The object type (objType) may be one of several different types of objects that the object identification controllers 34, 52, 66 are configured to detect, and may include, for example, cars, trucks, motorcycles, pedestrians, and/or signage. FIG. 7A depicts this situation, showing four first objects 28 detected by the first sensor 24 and five second objects 46 detected by the second sensor 42. The first objects 28 and the second objects 46 have similar locations and velocities in a four-dimensional coordinate system, as illustrated in FIG. 7B.

As illustrated in FIG. 7B, the first comparison controller 70 may be configured to determine a plurality of potential matchings 88 between each of the first objects 28 and an equal number of the second objects 46. With n number of the first objects 28 and n number of the second objects 46, the number of potential matchings 88 is $\frac{1}{2}*n*(n-1)$. Further-more, the first comparison controller 70 may be configured to determine an object matching distance 90 associated with each of the potential matchings 88, being the square root of the sum of the squares of differences between corresponding ones of the first characteristics and the second characteristics. In other words, the object matching distance 90 may be calculated by the formula: $d = \sqrt{(x-x')+(y-y')+(v_x-v_x')+(v_y-v_y')}$. The object matching distance 90 may also be calculated by any other function computing a suitable distance between two points in $IR^n$.

The first comparison controller 70 may be configured to determine if one of the first objects 28 matches one of the second objects 46 if the object matching distance 90 therebetween is below a given threshold value. In other words, the result can be regarded as "same" if the object matching distance 90 is smaller than a certain threshold. Such a case is illustrated in FIG. 7B, with one of the first objects 28 being labeled as a potential matching 88 with one of the second objects 46.

As illustrated in FIG. 9C, the first comparison controller 70 may be configured to determine a minimal matching distance 94 as the lowest object matching distance 90 of all of the potential matchings 88 between each of the first objects 28 and each of the second objects 46.

According to an aspect, a plausibility voter 84 is configured to use the best 2 out of 3 of the objects 28, 46, 60 from the object identification controllers 34, 52, 66 as the ones of the objects 28, 46, 60 having the lowest of the object matching distances 90 (for objects 28, 46, 60 having characteristics with certain values) or the ones of the objects 28, 46, 60 whose matching distance probability function $f_{dpm}(d)$ has the highest value for a given distance value d or for a plurality of distance values d between given upper and lower limits (for objects 28, 46, 60 having characteristics with uncertain values). The between given upper and lower limits may be chosen, for example, to correspond with the operating range of the corresponding one of the sensors 24, 42, 56. In other words, the system 20 may use detected ones of the objects 28, 46, 60 from the sensors 24, 42, 56 in agreement with one another, and may disregard anomalous ones of the objects 28, 46, 60 that are not corroborated with measurements from independent other ones of the sensors 24, 42, 56. In this way, the sensors 24, 42, 56 and the object identification controllers 34, 52, 66 can be validated, giving rise to a higher confidence in the objects 28, 46, 60 detected. The plausibility voter 84 may use other combinations, such as the best 3 of 4 or the best 3 of 5 from 4 or 5 different sensors 24, 42, 56 respectively.

Figures 8A, 8B:
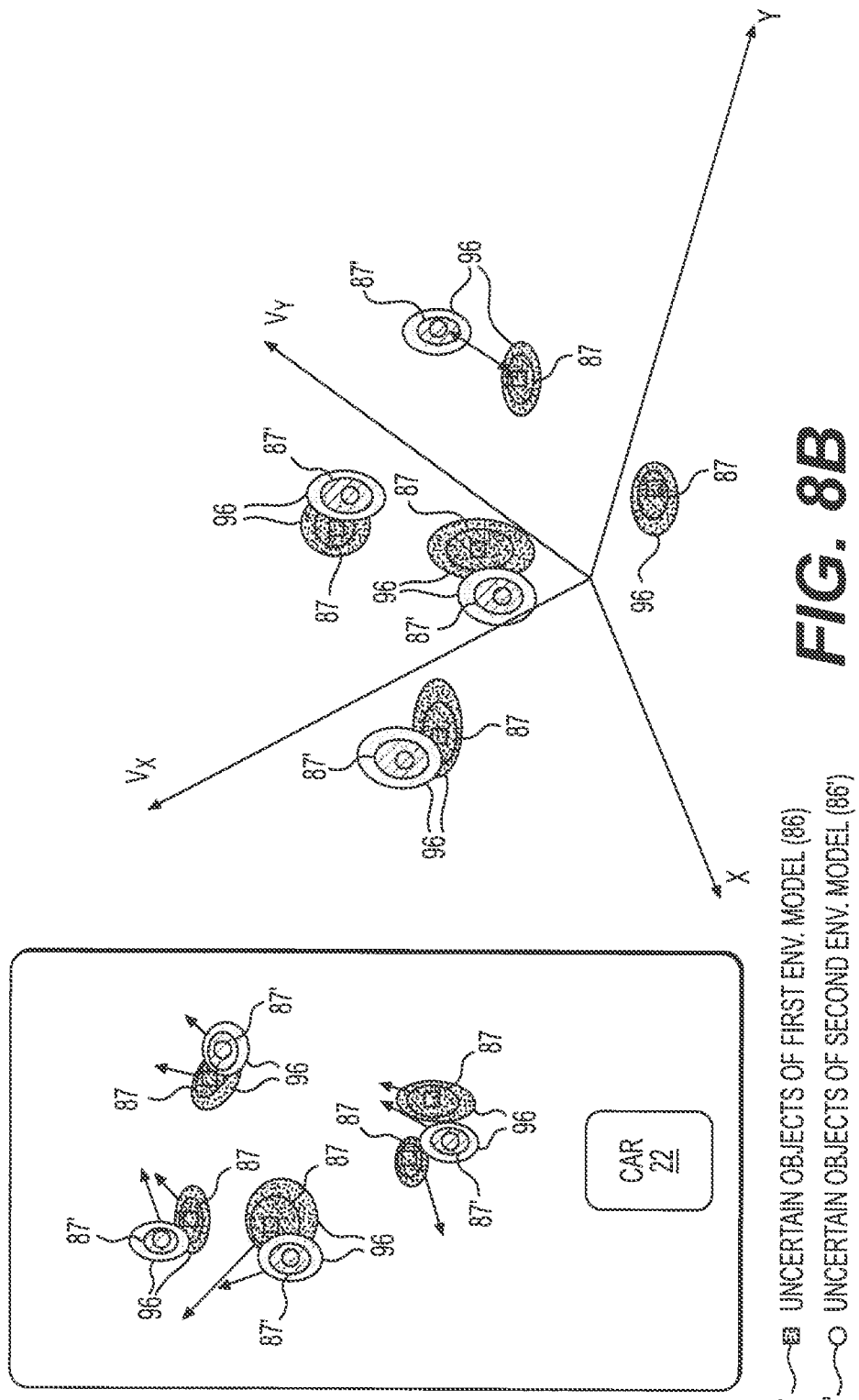
FIG. 8A is a diagram of uncertain objects having probability density distributions as high-dimensional feature vectors in space around a vehicle.
FIG. 8B is a diagram of the uncertain objects having probability density distributions of FIG. 8A in a 4-dimensional coordinate space.
Figure 11A:
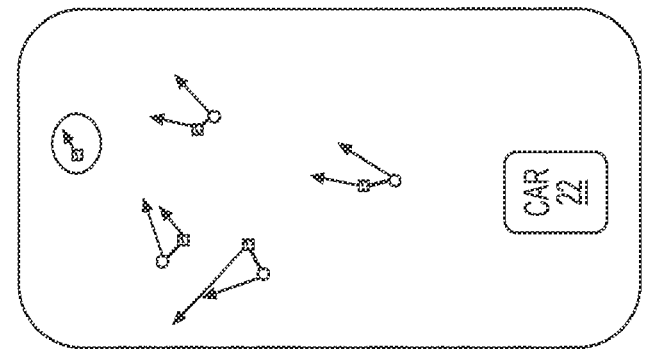
FIG. 11A is a diagram of an example of objects as high-dimensional feature vectors in space around a vehicle, with lines representing matchings between objects, and with an unmatched object circled.
Figure 11B:
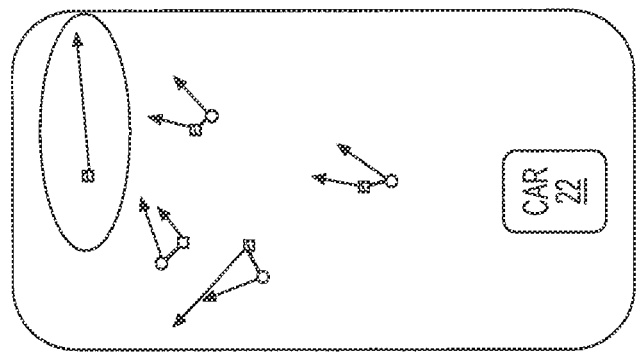
FIG. 11B is a diagram of another example of objects as high-dimensional feature vectors in space around a vehicle, with lines representing matchings between objects, and with an unmatched object circled.
Figure 11C:
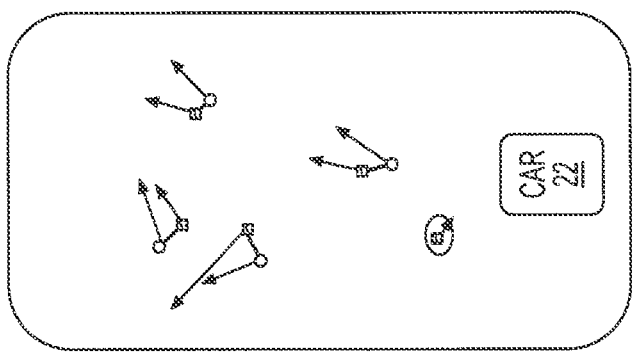
FIG. 11C is a diagram of another example of objects as high-dimensional feature vectors in space around a vehicle, with lines representing matchings between objects, and with an unmatched object circled.
Figure 11D:
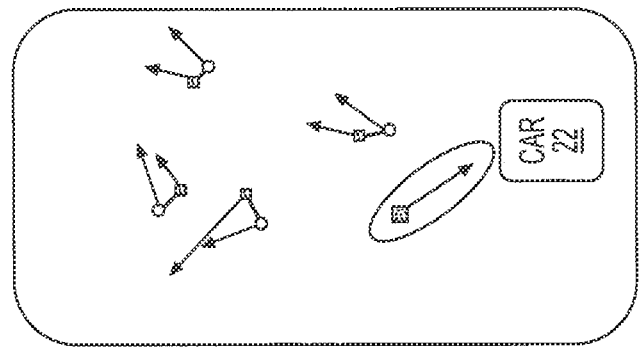
FIG. 11D is a diagram of another example of objects as high-dimensional feature vectors in space around a vehicle, with lines representing matchings between objects, and with an unmatched object circled.

As shown in FIGS. 5 and 6B, the system 20 includes a first model generator 85 combining the plurality of first objects 28 with the plurality of second objects 46 to generate a first environmental model 86 containing a plurality of first uncertain objects 87. Uncertain objects are objects that have at least one characteristic without a certain value. In other words, an uncertain object has at least one characteristic having a degree of uncertainty that can be represented by a probability density distribution for each of the characteristics thereof. In the example embodiment provided, the uncertain objects have multiple characteristics each having a degree of uncertainty. As illustrated in FIGS. 8A, and 8B, the uncertain objects can be represented as high-dimensional feature vectors with topographic lines and shaded regions representing probability density distributions for each of the characteristics thereof. A second model generator 85' similarly generates a second environmental model 86' containing a plurality of second uncertain objects 87', and which is different than the first environmental model 86. The second model generator 85' may use different sets of objects 28, 46, 60 data from different ones of the sensors 24, 42, 56 and/or a different processing algorithm to generate the second environmental model 86' when compared to the operation of the first model generator 85 in generating the first environmental model 86. The system 20 also includes a second comparison controller 70' for comparing the environmental models 86, 86' to one another. The second comparison controller 70' may be structured similarly to the first comparison controller 70 described above. The system 20 may include both first and second ones of the of the comparison controllers 70, 70'. Alternatively, the system 20 may include only one of first comparison controller 70 or the second comparison controller 70'. The model generators 85, 85' may be integrated with one or more of the object identification controllers 34, 52, 66 and/or with one or more of the comparison controllers 70, 70'.

Figure 14:
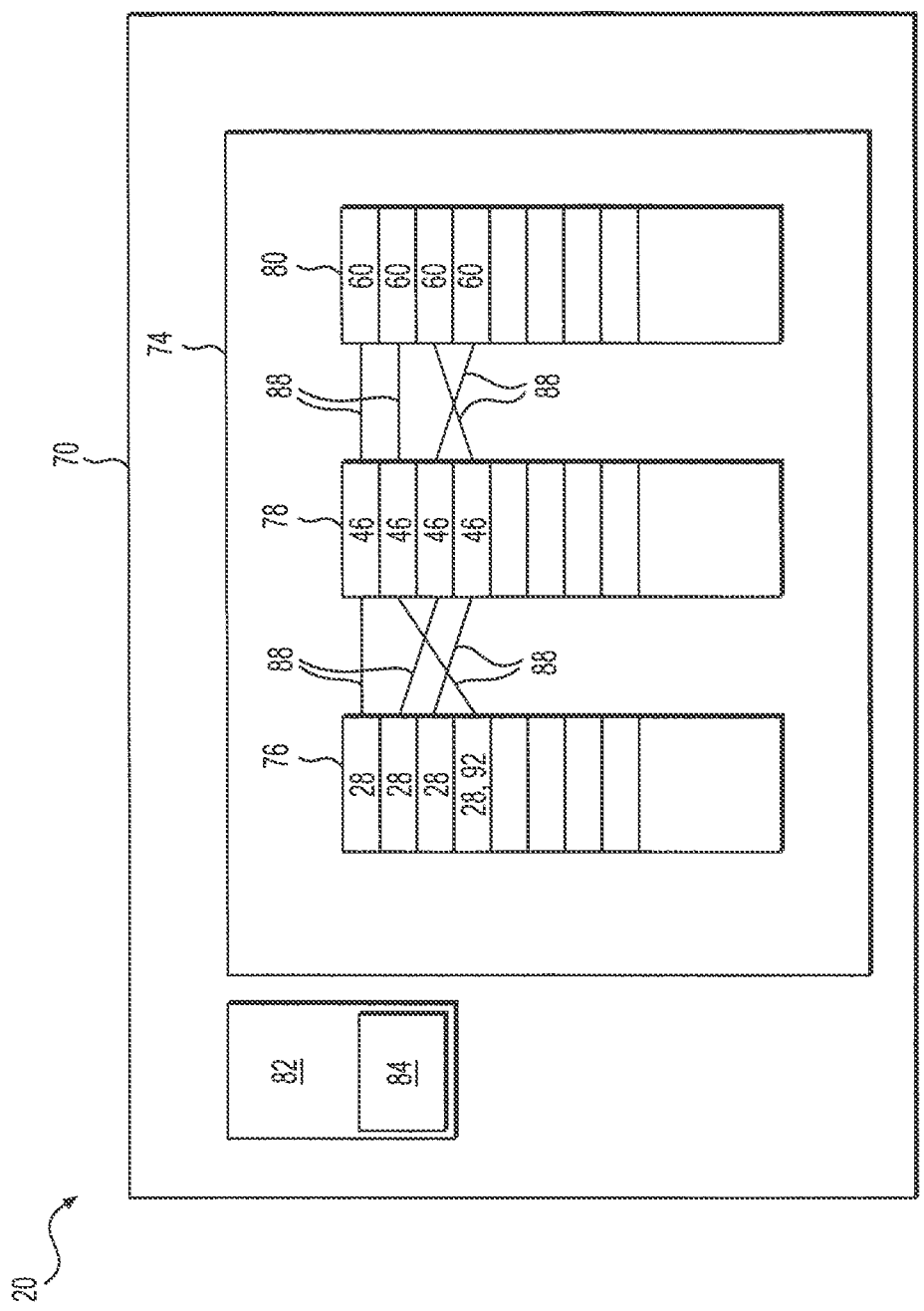
FIG. 14 is a schematic block diagram of the comparison controller.
Figure 15:
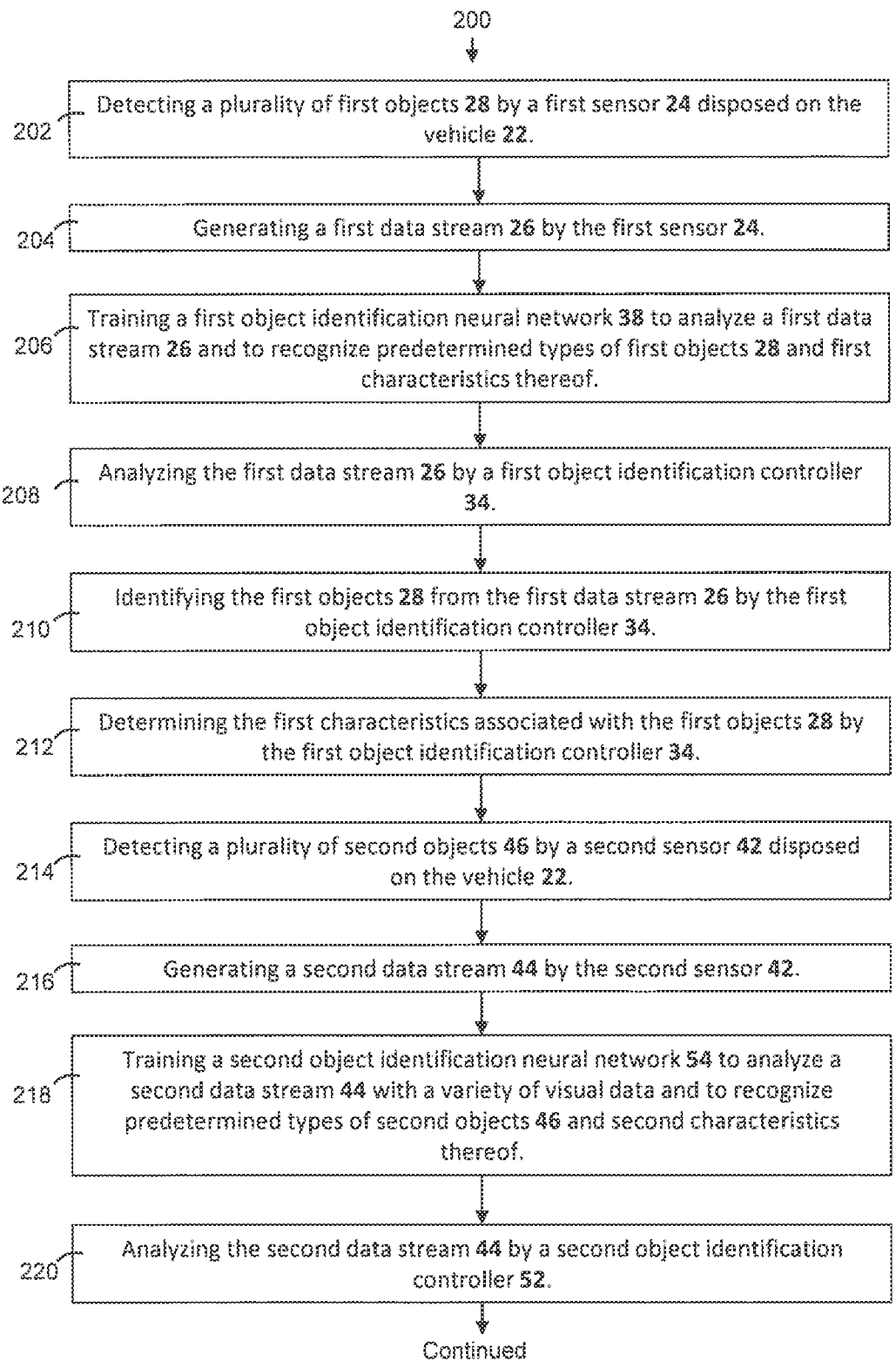
FIG. 15 is a flow chart of a method for correlating sensor data in a vehicle.
Figure 16:
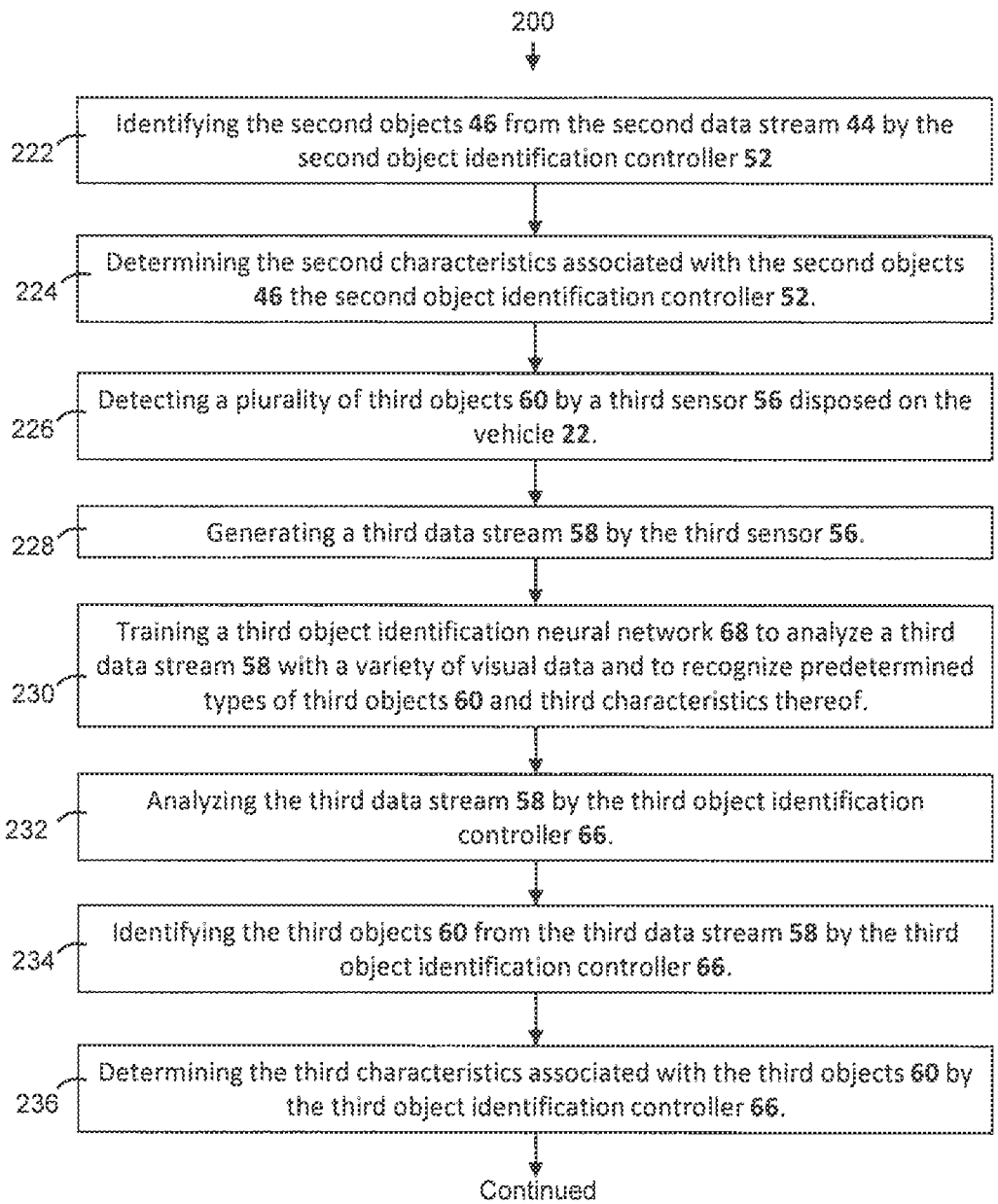
FIG. 16 is a continuation flow chart of the method of FIG. 15.
Figure 17:
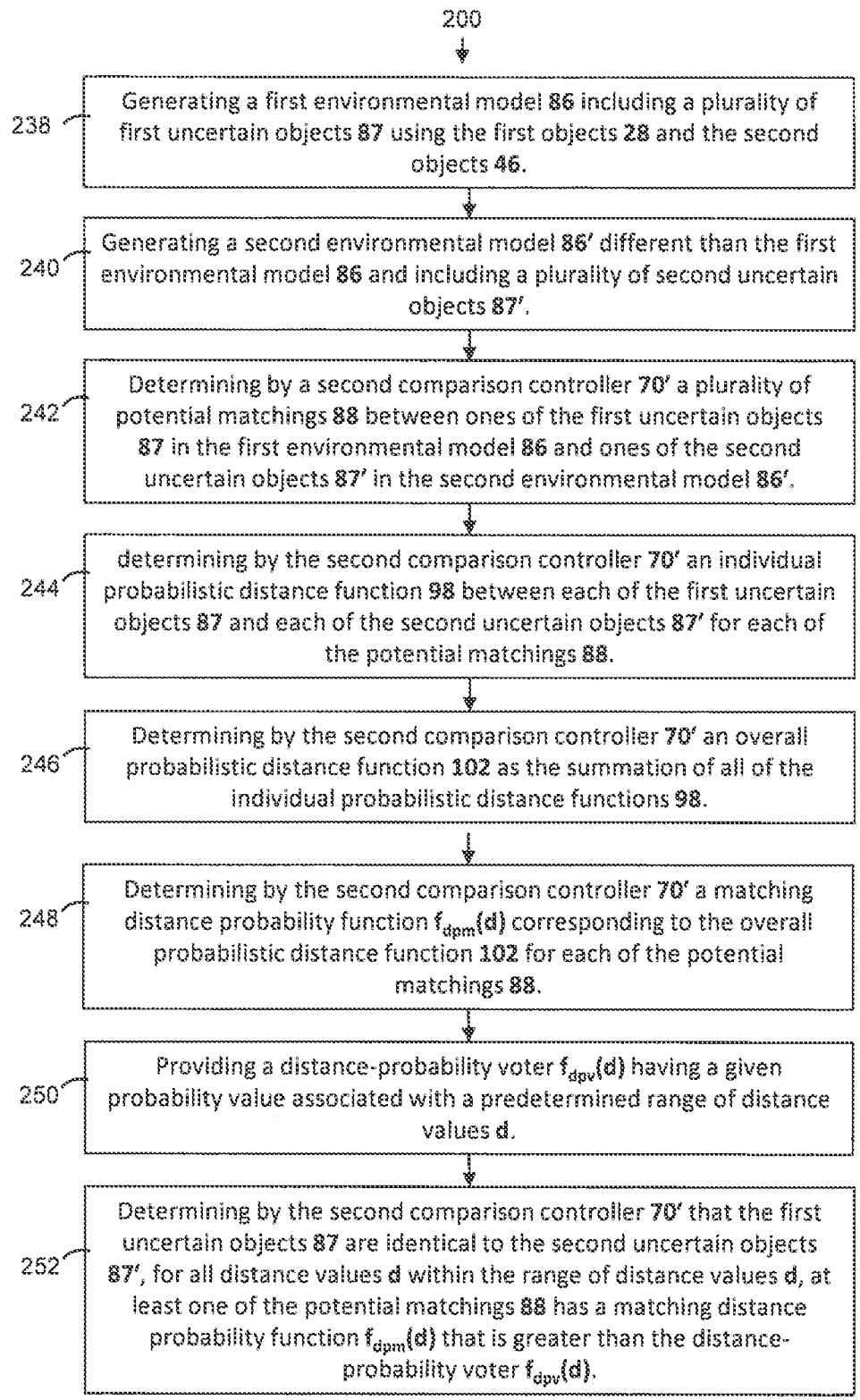
FIG. 17 is a continuation flow chart of the method of FIG. 15.

As shown in the block diagram of FIG. 14, the first comparison controller 70 may include a machine readable non-volatile memory 74 holding a first list 76 of first items each referring to ones of the first objects 28 and a second list 78 of second items each referring to ones of the second objects 46 and a third list 80 of third items each referring to ones of the third objects 60, and a processor 82. According to an aspect illustrated in FIGS. 10A-10C, the number of the first objects 28 detected by the first sensor 24 and the number of the second objects 46 detected by the second sensor 42 may not be equal.

To remedy this potential situation, a plurality of one or more dummy objects 92 may be added to either the first list 76 or to the second list 78, with the number of the dummy objects 92 being equivalent to the difference between the first cardinality and the second cardinality, such that the first list 76 and the second list 78 are each made to contain an equivalent number of items. FIG. 14 shows the lists 76, 78, 80, with lines therebetween illustrating potential matchings 88 between objects 28, 46, 60 therein. FIG. 14 also shows the first list 76 containing one dummy object 92, causing each of the lists 76, 78, 80 to contain an equal number of objects 28, 46, 60.

Similarly, the number of the first uncertain objects 87 in the first environmental model 86' may be unequal to the number of the second uncertain objects 87' in the second environmental model 86'. In that case, the first list 76 would include items referring to the first uncertain objects 87, and the second list 78 would include items referring to the second uncertain objects 87'. In that way, the number, or cardinality, of the first uncertain objects 87 may be made to match the number, or cardinality, of the second uncertain objects 87', which facilitates making a 1:1 matching between ones of the first uncertain objects 87 and corresponding ones of the second uncertain objects 87'.

According to an aspect of the disclosure, each of the dummy objects 92 has a relatively high value for the x position x and a relatively low value for the x velocity $v_x$ and a relatively low value for the y velocity to maximize the object matching distance 90 between one of the dummy objects 92 and an unmatched one of the objects 28, 46, 60 having a relatively high collision risk associated therewith as a result of a relatively low value for the x position or a relatively high value for the x velocity $v_x$ or for the y velocity $v_y$.

FIGS. 11A through 11D illustrate four different sets of first and second objects 28, 46, with matchings between corresponding ones of the objects 28, 46 being shown with a line therebetween and with unmatched ones of the objects 28, 46 being circled. The total distance between the sets of the objects increases from the smallest in FIG. 11A to the largest in FIG. 11D. The unmatched object closest to the vehicle 22 in FIG. 11D, with a relatively large velocity (indicated by a long arrow extending therefrom) would result in a large object matching distance 90 to a dummy object 92 having a relatively high value for the x position x and relatively low values for the y position y, the x velocity $v_x$, and the y velocity. Therefore, the unmatched object closest to the vehicle 22 in FIG. 11D, with the large velocity and close proximity to the vehicle 22 would disproportionately penalize more dangerous unmatched objects with a relatively large object matching distance 90. In summary, the overall distance between sets of objects 28, 46 is the minimal matching distance 94, including an object matching distance 90 to a dummy object 92, which increasingly penalizes more dangerous unmatched ones of the objects 28, 46 which are proximate to the vehicle 22 and/or moving with a high velocity.

Figure 4:
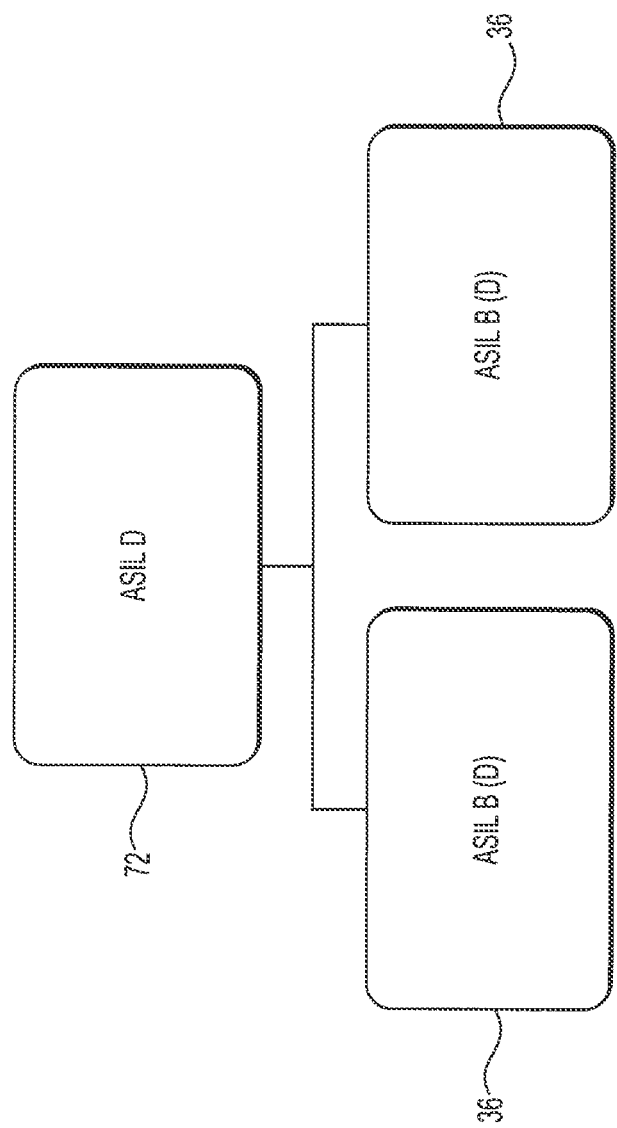
FIG. 4 is a block diagram illustrating ASIL decomposition.

According to an aspect, one or more of the comparison controllers 70, 70' may have a second Automotive Safety Integrity Level 72 greater than the first Automotive Safety Integrity Level 36. By combining information from multiple different sources having a lower ASIL level, such as, for example, by using a 2-out-of-3, also abbreviated as 2oo3, type voter configuration, the system 20 as a whole may operate at the higher, second Automotive Safety Integrity Level 72. For example, as shown in FIG. 5, the system 20 may operate at the higher ASIL D, even though the object identification controllers 34, 52, 66 each operate at the lower first Automotive Safety Integrity Level 36 of ASIL B. This process is known as ASIL decomposition and is illustrated in the diagram of FIG. 4. In other words, in order to reach ASIL D, it is possible to combine lower ASIL components and compare their results with a plausibility voter 84. This has practical advantages in that the complex circuitry and algorithms used in the object identification controllers 34, 52, 66 cannot be economically made to reach the highest Automotive Safety Integrity Levels, if they can be made to do so at all. In other words, more powerful and less reliable ASIL B hardware can run the complex time-consuming algorithm, whereas the less powerful but more reliable ASIL D hardware can simply compare the results and check whether they are identical or reasonably similar.

The second comparison controller 70' includes a processor 82 configured to determine a plurality of potential matchings 88 between each of the first uncertain objects 87 within the first environmental model 86 and each of the second uncertain objects 87' within the second environmental model 86'. A graphic example of two different potential matchings 88 between first and second uncertain objects 87, 87' is shown by the solid and the dashed lines in FIG. 13A. As illustrated in FIGS. 13A-13B, the second comparison controller 70' is also configured to determine a matching distance probability function $f_{dpm}(d)$ for each of the plurality of potential matchings 88.

Figures 12A, 12B, 12C:
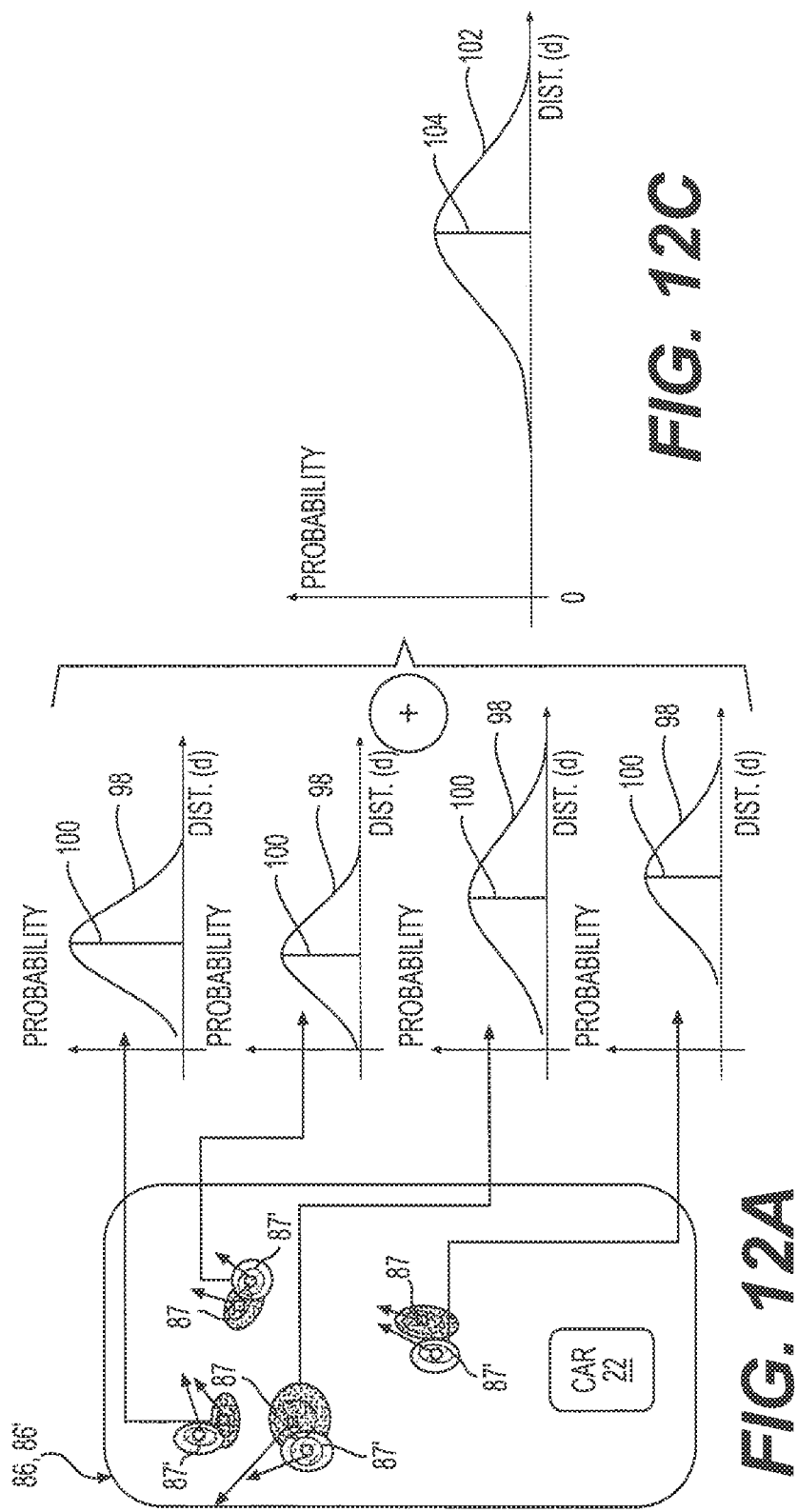
FIG. 12A is a diagram of two environmental models of uncertain objects each having probability density distributions as high-dimensional feature vectors in space around a vehicle.
FIG. 12B shows four individual probabilistic distance functions for a certain matching between the uncertain objects of the two environmental models of FIG. 12A.
FIG. 12C shows an overall probabilistic distance function for a certain matching between the uncertain objects of the two environmental models of FIG. 12B.

As illustrated in FIGS. 12A-12B, the second comparison controller 70' is configured to determine an individual probabilistic distance function 98 between each of the first uncertain objects 87 and each of the second uncertain objects 87' for each of the potential matchings 88 between the first uncertain objects 87 and the second uncertain objects 87', and with each of the individual probabilistic distance functions 98 having a first mean value 100. FIG. 12B shows four individual probabilistic distance functions 98 for a certain matching of the first uncertain objects 87 and the second uncertain objects 87', having relatively high probabilities corresponding with relatively low distances. However, other individual probabilistic distance functions 98 are created for all other potential matchings 88 between each of the first uncertain objects 87 and the second uncertain objects 87' in order to determine which one or ones of the potential matchings 88 between the first uncertain objects 87 and the second uncertain objects 87' are the "best" of the potential matchings 88.

As illustrated in FIGS. 12B-12C, the second comparison controller 70' is configured to determine an overall probabilistic distance function 102 as the summation of all of the individual probabilistic distance functions 98 related to a certain matching. As shown in FIGS. 12C and 13B, each of the second probabilistic distance functions 102 have a second mean value 104.

As shown in FIGS. 13B-13D, the second comparison controller 70' is configured to determine a matching distance probability function $f_{dpm}(d)$ corresponding to the overall probabilistic distance function 102 for each of the potential matchings 88, and which relates the probability that the sum of the distances between each of the first uncertain objects 87 and corresponding ones of the second uncertain objects 87' is less than a given distance value d. As shown by the dark shaded area under the curve in FIG. 13B, the matching distance probability function $f_{dpm}(d)$ is equal to the integral of the overall probabilistic distance function 102 over a distance range of 0 to the given distance value d.

According to an aspect, different ones of the potential matchings 88 may be "best" for different given distance values d. For example, FIGS. 13A, 13B, and 13C, show two different matchings, with a best matching for distance d1 being shown with a dashed line, and a best matching for distance d2 being shown with a solid line. In other words, For instance, for a first given distance value d1, the first matching distance is, with a probability of 70%, smaller than d1, whereas the second matching is, with a probability of only 60%, smaller than d1. If we use a second given distance value d2, the first matching is, with a probability of 90%, smaller than d2, whereas the second matching is, with a probability of 99%, smaller than d2. Thus, you can no longer say whether the first or second matching is the better one. It depends on the given distance.

The second comparison controller 70' is also configured to include a distance-probability voter $f_{dpv}(d)$ to determine the first uncertain objects 87 are identical to the second uncertain objects 87' if, for all distance values d within a predetermined range of distance values d, the matching distance probability function $f_{dpm}(d)$ of at least one of the potential matchings 88 is greater than the distance-probability voter $f_{dpv}(d)$. This is shown graphically in FIG. 13C, with one or both of the lines representing the distance probability functions $f_{dpm}(d)$ for the two illustrated potential matchings being greater than the distance-probability voter $f_{dpv}(d)$ line throughout the predetermined range of distance values d from 0 to $d_{max}$. In other words, in the example shown in FIGS. 13A-13C, the distance-probability voter $f_{dpv}(d)$ would determine the first uncertain objects 87 are identical to the second uncertain objects 87' because for all distance values d from 0 to $d_{max}$, at least one of the distance probability functions $f_{dpm}(d)$ is higher than the distance-probability voter $f_{dpv}(d)$. This is true even though different matchings with different distance probability functions $f_{dpm}(d)$ are higher than the distance-probability voter $f_{dpv}(d)$ at each of the two given distances d1 and d2. The predetermined range of distance values d may be chosen to correlate with the operational range of one or more of the sensors 24, 42, 56, and/or to exclude false positive detections such as may be caused, for example, by dust, birds, insects or noise.

The distance-probability voter $f_{dpv}(d)$ may be predetermined and static, or may be dynamically adjusted based on operating conditions. Different distance-probability voters $f_{dpv}(d)$ may be used for different ones of the objects 28, 46, 60. For example, a distance-probability voter $f_{dpv}(d)$ used in conjunction with sensors 24, 42, 56 that are optimized for short-range operation may require a higher probability over relatively low distances as compared with a distance-probability voter $f_{dpv}(d)$ used with sensors 24, 42, 56 optimized for long-range operation.

A method 200 for correlating sensor data in a vehicle 22 is also provided. The method 200 includes 202 detecting a plurality of first objects 28 by a first sensor 24 disposed on the vehicle 22, with each of the first objects 28 having a plurality of first characteristics. Those characteristics may include, for example, a first x position x in an x direction, a first y position y in a y direction orthogonal to the x direction, a first x velocity $v_x$ in the x direction, and a first y velocity $v_y$ in the y direction. Step 202 of detecting a plurality of first objects 28 may also include detecting other first characteristics of the first objects 28 such as, for example, angular sizes in x and y directions, object type, color, shape, and/or motion characteristics.

The method 200 also includes 204 generating a first data stream 26 by the first sensor 24. The first data stream 26 may include a digital or an analog signal, such as a video signal. The first sensor 24 may perform some pre-processing such as filtering noise or ignoring specific known nuisance signals as part of the step of 204 generating the first data stream 26.

Figure 3:
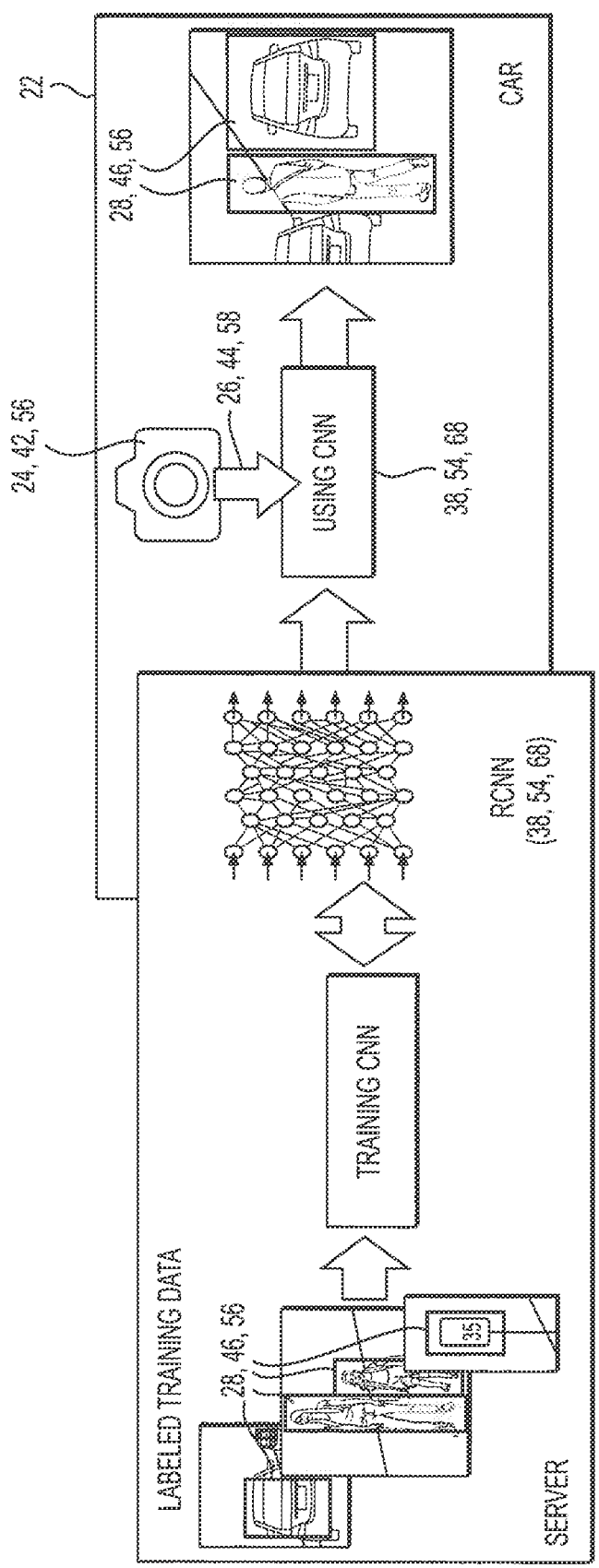
FIG. 3 is a schematic diagram showing the process of training a convolutional neural network using image data, then using the convolutional neural network to recognize objects within a data stream from a sensor.

The method 200 also includes 206 training a first object identification neural network 38 to analyze a first data stream 26 with a variety of visual data and to recognize predetermined types of first objects 28 and first characteristics. This step is illustrated by the left side of FIG. 3 and may be performed on a server or other device remote from the vehicle 22. The step of training the first object identification neural network 38 may include updated or revised training configurations, for example, to improve the functionality of the first object identification neural network 38. Such improved functionality may include, for example, improved recognition of existing objects 28, 46, 60 or characteristics associated therewith, or the ability to recognize additional types of objects 28, 46, 60 or characteristics such as, for example, different types of signage or visual characteristics of new vehicles. The object matching distances 90 discussed may also be used during the training step, with the object matching distances 90 being used to describe or to quantify the similarity between the result created by the neural network and a ground truth labeling.

The method 200 also includes 208 analyzing the first data stream 26 by a first object identification controller 34. The step of analyzing the first data stream 26 may be performed by a first object identification neural network 38 of the first object identification controller 34.

The method 200 also includes 210 identifying the first objects 28 from the first data stream 26 by the first object identification controller 34. The step of identifying the first objects 28 from the first data stream 26 may be performed by the first object identification neural network 38 of the first object identification controller 34.

The method 200 also includes 212 determining the first characteristics associated with the first objects 28 by the first object identification controller 34. The step of determining the first characteristics associated with the first objects 28 may be performed by the first object identification neural network 38 of the first object identification controller 34.

The method 200 also includes 214 detecting a plurality of second objects 46 by a second sensor 42 disposed on the vehicle 22, with each of the second objects 46 having a plurality of second characteristics including a second x position x' in the x direction, a second y position y' in the y direction, a second x velocity $v_x'$ in the x direction, and a second y velocity $v_y'$ in the y direction. Step 214 of detecting a plurality of second objects 46 may also include detecting other second characteristics of the second objects 46 such as, for example, angular sizes in x and y directions, color, shape, and/or motion characteristics.

The method 200 also includes 216 generating a second data stream 44 by the second sensor 42. The second data stream 44 may include a digital or an analog signal, such as a video signal. The second sensor 42 may perform some pre-processing such as filtering noise or ignoring specific known nuisance signals as part of the step of generating the second data stream 44.

The method 200 also includes 218 training a second object identification neural network 54 to analyze a second data stream 44 with a variety of visual data and to recognize predetermined types of second objects 46 and second characteristics thereof. This step is illustrated by the left side of FIG. 3 and may be performed on a server or other device remote from the vehicle 22. The step of training the second object identification neural network 54 may include updated or revised training configurations, for example, to improve the functionality of the first object identification neural network 38. Such improved functionality may include, for example, improved recognition of existing objects 28, 46, 60 or characteristics associated therewith, or the ability to recognize additional types of objects 28, 46, 60 or characteristics such as, for example, different types of signage or visual characteristics of new vehicles. The object matching distances 90 discussed may also be used during the training step, with the object matching distances 90 being used to describe or to quantify the similarity between the result created by the neural network and a ground truth labeling.

The method 200 also includes 220 analyzing the second data stream 44 by a second object identification controller 52. The step of analyzing the second data stream 44 may be performed by the second object identification neural network 54 of the second object identification controller 52.

The method 200 also includes 222 identifying the second objects 46 from the second data stream 44 by the second object identification controller 52. The step of identifying the second objects 46 from the second data stream 44 may be performed by the second object identification neural network 54 of the second object identification controller 52.

The method 200 also includes 224 determining the second characteristics associated with the second objects 46 the second object identification controller 52. The step of 224 determining the second characteristics associated with the second objects 46 may be performed by the second object identification neural network 54 of the second object identification controller 52.

The method 200 also includes 226 detecting a plurality of third objects 60 by a third sensor 56 disposed on the vehicle 22, with each of the third objects 60 having a plurality of third characteristics including a third x position x" in the x direction, a third y position y" in the y direction, a third x velocity $v_x''$ in the x direction, and a third y velocity $v_y''$ in the y direction. Step 226 of detecting a plurality of third objects 60 may also include detecting other third characteristics of the third objects 60 such as, for example, angular sizes in x and y directions, color, shape, and/or motion characteristics.

The method 200 also includes 228 generating a third data stream 58 by the third sensor 56. The third data stream 58 may include a digital or an analog signal, such as a video signal. The third sensor 56 may perform some pre-processing such as filtering noise or ignoring specific known nuisance signals as part of the step of generating the third data stream 58.

The method 200 also includes 230 training a third object identification neural network 68 to analyze a third data stream 58 with a variety of visual data and to recognize predetermined types of third objects 60 and third characteristics thereof. This step is illustrated by the left side of FIG. 3 and may be performed on a server or other device remote from the vehicle 22. The step of training the third object identification neural network 68 may include updated or revised training configurations, for example, to improve the functionality of the first object identification neural network 38. Such improved functionality may include, for example, improved recognition of existing objects 28, 46, 60 or characteristics associated therewith, or the ability to recognize additional types of objects 28, 46, 60 or characteristics such as, for example, different types of signage or visual characteristics of new vehicles. The object matching distances 90 discussed may also be used during the training step, with the object matching distances 90 being used to describe or to quantify the similarity between the result created by the neural network and a ground truth labeling.

The method 200 also includes 232 analyzing the third data stream 58 by the third object identification controller 66. The step of analyzing the third data stream 58 may be performed by the third object identification neural network 68 of the object identification controller 66.

The method 200 also includes 234 identifying the third objects 60 from the third data stream 58 by the third object identification controller 66. The step of identifying the third objects 60 from the third data stream 58 may be performed by the third object identification neural network 68 of the object identification controller 66.

The method 200 also includes 236 determining the third characteristics associated with the third objects 60 by the third object identification controller 66. The step of determining the third characteristics associated with the third objects 60 may be performed by the third object identification neural network 68 of the object identification controller 66.

The method 200 also includes 238 generating a first environmental model 86 including a plurality of first uncertain objects 87 using the first objects 28 and the second objects 46. This step of 238 generating a first environmental model 86 may be performed by a processor 82 of a first model generator 85. The first environmental model 86 may be used for several different purposes such as, for example, in autonomous or augmented driving systems, for advanced driver assistance (ADAS) systems, and/or for visual aids such as augmented reality displays that help to highlight important and/or low-visibility objects 28, 46, 60 existing in space around the vehicle 22.

The method 200 also includes 240 generating a second environmental model 86' different than the first environmental model 86 and including a plurality of second uncertain objects 87'. This step of 240 generating a second environmental model 86' may be performed by a processor 82 of a second model generator 85'. The second environmental model 86' may be used for several different purposes such as, for example, in autonomous or augmented driving systems, for advanced driver assistance (ADAS) systems, and/or for visual aids such as augmented reality displays that help to highlight important and/or low-visibility objects 28, 46, 60 existing in space around the vehicle 22.

The method 200 also includes 242 determining by a second comparison controller 70' a plurality of potential matchings 88 between ones of the first uncertain objects 87 in the first environmental model 86 and ones of the second uncertain objects 87' in the second environmental model 86'.

The method 200 also includes 244 determining by the second comparison controller 70' an individual probabilistic distance function 98 between each of the first uncertain objects 87 and each of the second uncertain objects 87' for each of the potential matchings 88 between the first uncertain objects 87 and the second uncertain objects 87'.

The method 200 also includes 246 determining by the second comparison controller 70' an overall probabilistic distance function 102 as the summation of all of the individual probabilistic distance functions 98.

The method 200 also includes 248 determining by the second comparison controller 70' a matching distance probability function $f_{dpm}(d)$ corresponding to the overall probabilistic distance function 102 for each of the potential matchings 88.

As shown in the flow chart of FIG. 18, the method 200 may also include 250 providing a distance-probability voter $f_{dpv}(d)$ having a given probability value associated with a predetermined range of distance values d. For example, as shown on FIG. 13C, the range of distance values d may include distances from 0 to some non-zero distance, which may be approximately equal to the farthest operating distance of the sensors 24, 42, 56.

The method 200 also includes 252 determining by the second comparison controller 70' that the first uncertain objects 87 are identical to the second uncertain objects 87', for all distance values d within the range of distance values d, at least one of the potential matchings 88 has a matching distance probability function $f_{dpm}(d)$ that is greater than the distance-probability voter $f_{dpv}(d)$.

According to an aspect, and as shown in the flow chart of FIG. 19, the method 200 may further include 260 determining a first cardinality as the number of the first objects 28 detected by the first sensor 24 or the number of the first uncertain objects 87 in the first environmental model 86. This step may be performed, for example, by the first object identification controller 34 or by one or both of the comparison controllers 70, 70'. In other words, the first object identification controller 34 or one of the comparison controllers 70, 70' may count the number of the first objects 28 and/or the number of the first uncertain objects 87 to determine the first cardinality. The first cardinality may be updated as any of the objects 28, 46, 60 or the uncertain objects 87, 87' change and/or if any of the data streams 26, 44, 58 from any of the sensors 24, 42, 56 changes, and/or on a periodic basis.

The method 200 may also include 262 determining a second cardinality as the number of the second objects 46 detected by the second sensor 42 or the number of the second uncertain objects 87' in the second environmental model 86'. This step may be performed, for example, by the second object identification controller 52 or by one or both of the comparison controllers 70, 70'. The second cardinality may be updated as any of the objects 28, 46, 60 or the uncertain objects 87, 87' change and/or if any of the data streams 26, 44, 58 from any of the sensors 24, 42, 56 changes, and/or on a periodic basis.

The method 200 may also include 264 generating a first list 76 of first items each referring to one of the first objects 28 or to one of the first uncertain objects 87. This step may be performed, for example, by the second object identification controller 52 or by one or both of the comparison controllers 70, 70'. An example of the first list 76 is shown on FIG. 14.

The method 200 may also include 266 generating a second list 78 of second items each referring to one of the second objects 46 or to one of the second uncertain objects 87'. This step may be performed, for example, by the second object identification controller 52 or by one or both of the comparison controllers 70, 70'. An example of the second list 78 is shown on FIG. 14.

The method 200 may also include 268 adding by one or both of the comparison controllers 70, 70', a plurality of one or more dummy objects 92 to the first list or to the second list, with the number of the dummy objects 92 being equivalent to the difference between the first cardinality and the second cardinality, such that the first list 76 and the second list 78 are each made to contain an equivalent number of items.

As shown in FIG. 14, a third list 80 may also be included, which may include items referring to the third objects 60 or to third uncertain objects. With three lists, one or both of the comparison controllers 70, 70' may add one or more dummy objects 92 to that third list 80 of the third objects 60, with the number of dummy objects 92 added to the third list 80 being equal to the difference between the third cardinality and the first or second cardinality, such that the third list 80 is made to contain an equivalent number of items as at least one of the first list 76 and/or the second list 78.

According to an aspect, each of the dummy objects 92 may have a relatively high value for the x position x and a relatively low value for the x velocity $v_x$ and a relatively low value for the y velocity to maximize the object matching distance 90 between one of the dummy objects 92 and an unmatched one of the objects 28, 46, 60 having a relatively high collision risk associated therewith as a result of a relatively low value for the x position or a relatively high value for the x velocity $v_x$ or for the y velocity $v_y$.

According to an aspect, and particularly for objects 28, 46, 60 having characteristics with certain values, the method 200 may further include 270 determining by the comparison controller 70 a minimal matching distance 94 as the lowest object matching distance 90 of all of the potential matchings 88.

The method 200 may proceed with the step of 272 determining by the comparison controller 70 if one of the first objects 28 matches one of the second objects 46 if the object matching distance 90 therebetween is below a given threshold value. In other words, the comparison controller 70 may determine if one of the first objects 28 is the same as one of the second objects 46 if they are close enough to one another if the vector sum of the differences between their characteristics is below a given threshold value.

According to an aspect, the method 200 may include 280 selecting, by the plausibility voter 84, the best 2 out of 3 of the objects 28, 46, 60 from the object identification controllers 34, 52, 66 as the ones of the objects 28, 46, 60 having the lowest of the object matching distances 90 or the ones of the objects 28, 46, 60 whose matching distance probability function $f_{dpm}(d)$ has the highest value for a given distance value d or for a plurality of distance values d between given upper and lower limits. This step 282 of selecting the best of the objects 28, 46, 60 may include using those objects for making control decisions and/or for presentation to an operator of the vehicle. This step 282 of selecting the best of the objects 28, 46, 60 may also include discarding and not using one or more of the objects 28, 46, 60. The plausibility voter 84 may use other combinations, such as the best 3 of 4 or the best 3 of 5 from 4 or 5 different sensors 24, 42, 56 respectively in performing this step 282 of selecting the best of the objects 28, 46, 60.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Obviously, many modifications and variations of the present invention are possible in light of the above teachings and may be practiced otherwise than as specifically described while within the scope of the appended claims.

What is claimed is:

1. A system for correlating sensor data in a vehicle and comprising:
   a first sensor disposed on the vehicle to detect a plurality of first objects each having a plurality of first characteristics;
   a second sensor disposed on the vehicle to detect a plurality of second objects each having a plurality of second characteristics;
   a first model generator combining the plurality of first objects with the plurality of second objects to generate a first environmental model containing a plurality of first uncertain objects, each having a probability density distribution of a characteristic thereof;

a second model generator generating a second environmental model different than said first environmental model and containing a plurality of second uncertain objects, each having a probability density distribution of a characteristic thereof, a comparison controller including a processor configured to determine a-potential matchings between each uncertain object within the first environmental model and each uncertain object within the second environmental model; and wherein the comparison controller is configured to determine a matching distance probability function for each of the plurality of potential matchings, wherein the matching distance probability function for each of the plurality of potential matchings indicates a probability that a sum of distances between each of the plurality of first uncertain objects and corresponding ones of the second uncertain objects is less than a predetermined distance value.

2. The system for correlating sensor data in a vehicle as set forth in claim 1, wherein the comparison controller includes a distance-probability voter and is configured to determine the plurality of first uncertain objects is identical to the plurality of second uncertain objects if, for all distance values within a predetermined range of distance values, the matching distance probability function of at least one of the potential matchings 1s greater than the distance-probability voter.

3. The system for correlating sensor data in a vehicle as set forth in claim 1, further including:
   a first cardinality being the number of the first objects detected by the first sensor or the number of the first uncertain objects generated by the first model generator;
   a second cardinality being the number of the second objects detected by the second sensor or the number of the second uncertain objects generated by the second model generator;
   a first list of first items and a second list of second items;
   wherein each of the first items refers to one of the first objects or to one of the first uncertain objects;
   wherein each of the second items refers to one of the second objects or to one of the second uncertain objects;
   a plurality of one or more dummy objects on either the first list of the first items or on the second list of the second items, with the number of the dummy objects being equivalent to the difference between the first cardinality and the second cardinality, such that the first list and the second list are each made to contain an equivalent number of the items.

4. The system for correlating sensor data in a vehicle as set forth in claim 3, wherein each of the dummy objects has a relatively high value of the absolute value of a y position.

5. The system for correlating sensor data in a vehicle as set forth in claim 1, further including:
   a first object identification controller having a first Automotive Safety Integrity Level associated therewith and identifying the first objects and determining the first characteristics associated therewith;
   a second object identification controller having the first Automotive Safety Integrity Level associated therewith and identifying the second objects and determining the second characteristics associated therewith; and
   said comparison controller having a second Automotive Safety Integrity Level greater than the first Automotive Safety Integrity Level; and wherein the system functions at the second Automotive Safety Integrity Level.

6. The system for correlating sensor data in a vehicle as set forth in claim 5, further including: a third object identification controller having the first Automotive Safety Integrity Level associated therewith and identifying a plurality of third objects and determining a plurality of third characteristics associated therewith; and wherein the comparison controller is configured to use the best of the objects from the object identification controllers, being the ones of the objects whose matching distance probability function has the highest value for a given distance value or for a plurality of distance values between given upper and lower limits.

7. The system for correlating sensor data in a vehicle as set forth in claim 6, further including a third sensor disposed on the vehicle detecting the plurality of third objects.

8. The system for correlating sensor data in a vehicle as set forth in claim 1, wherein the object identification controllers each include a convolutional neural network for analyzing a data stream from the associated one of the sensors and to identify the third objects and to determine the characteristics associated therewith.

9. The system for correlating sensor data in a vehicle as set forth in claim 8, wherein at least one of the convolutional neural networks is a region-based convolutional neural network.

10. The system for correlating sensor data in a vehicle as set forth in claim 1, wherein the first characteristics include a first position coordinate in an x direction, a first position coordinate in a y direction orthogonal to the x direction, a first velocity in the x direction, a first velocity in the y direction; and
    wherein the second characteristics include a second position coordinate in the x direction, a second position coordinate in the y direction; a second velocity in the x direction, and a second velocity in the y direction.

11. A system for correlating sensor data in a vehicle and comprising:
    a first sensor disposed on the vehicle to detect a plurality of first objects each having a plurality of first characteristics;
    a first object identification controller having a first Automotive Safety Integrity Level associated therewith and configured to identify the first objects and to determine the first characteristics associated therewith;
    a second sensor disposed on the vehicle to detect a plurality of second objects each having a plurality of second characteristics;
    a second object identification controller to identify the second objects and to determine the second characteristics associated therewith; and
    a comparison controller having a second Automotive Safety Integrity Level greater than the first Automotive Safety Integrity Level to correlate the plurality of first objects with the plurality of second objects, wherein the comparison controller is configured a plurality of potential matchings between the first objects and the second objects and to determine a matching distance probability function for each of the plurality of potential matchings, wherein the matching distance probability function for each of the plurality of potential matchings indicates a probability that a sum of distances between each of the plurality of first objects and corresponding ones of the second objects is less than a predetermined distance value, and
    wherein the system functions at the second Automotive Safety Integrity Level.

12. The system for correlating sensor data in a vehicle as set forth in claim 11,
wherein the comparison controller is configured to determine if one of the first objects matches one of the second objects if the matching distance there between is below a given threshold value.

13. The system for correlating sensor data in a vehicle as set forth in claim 12, wherein the object matching distance is the square root of the sum of the squares of differences between corresponding ones of the first characteristics and the second characteristics.

14. A method for correlating sensor data in a vehicle and comprising:
   detecting a plurality of first objects by a first sensor disposed on the vehicle, with each of the first objects having a plurality of first characteristics;
   detecting a plurality of second objects by a second sensor disposed on the vehicle, with each of the second objects having a plurality of second characteristics;
   generating a first environmental model including a plurality of first uncertain objects by a first model generator using said first objects and said second objects;
   generating by a second model generator, a second environmental model, different than the first environmental model and including a plurality of second uncertain objects;
   determining a plurality of potential matchings between ones of the first uncertain objects and ones of the second uncertain objects;
   determining an individual probabilistic distance function for each of the potential matchings;
   determining an overall probabilistic distance function as the summation of all of the individual probabilistic distance functions; and
   determining a matching distance probability function corresponding to the overall probabilistic distance function for each of the potential matchings wherein the matching distance probability function for each of the plurality of potential matchings indicates a probability that a sum of distances between each of the plurality of first uncertain objects and corresponding ones of the second uncertain objects is less than a predetermined distance value.

15. The method for correlating sensor data in a vehicle as set forth in claim 14, further including:
   providing a distance-probability voter having a given probability value associated with a range of distance values; and
   determining that the plurality of first uncertain objects are identical to the plurality of second uncertain objects it for all distance values within a predetermined range of distance values, the matching distance probability function of at least one of the potential matchings is greater than the distance-probability voter.

16. The method for correlating sensor data in a vehicle as set forth in claim 14, further including:
   determining a first cardinality being the number of the first objects or the number of the first uncertain objects;
   determining a second cardinality being the number of the second objects or the number of the second uncertain objects;
   generating a first list of first items each referring to one of the first objects or to one of the first uncertain objects;
   generating a second list of second items each referring to one of the second objects or to one of the second uncertain objects;
   adding by the comparison controller a plurality of one or more dummy objects to the first list or to the second list, with the number of the dummy objects being equivalent to the difference between the first cardinality and the second cardinality, such that the first list and the second list are each made to contain an equivalent number of items.

17. The method for correlating sensor data in a vehicle as set forth in claim 16, wherein each of the dummy objects has a relatively high value for a position coordinate in an x direction and a relatively low value for the velocity in the x direction and a relatively low value for the velocity in a y direction to maximize the object matching distance between one of the dummy objects and an unmatched one of the objects having a relatively high collision risk associated therewith as a result of a relatively low value for the position coordinate in the x direction or a relatively high value for the velocity in the x direction or for the velocity in the y direction.

18. The method for correlating sensor data in a vehicle as set forth in claim 14, further including selecting, by a plausibility voter, the best of the uncertain objects whose individual probabilistic distance function has the highest value for a given distance value or for a plurality of distance values between given upper and lower limits.

19. The method for correlating sensor data in a vehicle as set forth in claim 14, further including:
   generating a first data stream by the first sensor; and
   analyzing the first data stream by a first object identification controller;
   identifying the first objects from the first data stream by the first object identification controller;
   generating a second data stream by the second sensor;
   analyzing the second data stream by a second object identification controller; and
   identifying the second objects from the second data stream by the second object identification controller.

20. The method for correlating sensor data in a vehicle as set forth in claim 19, further including:
   determining the first characteristics associated with the first objects by the first object identification controller; and
   determining the second characteristics associated with the second objects by the second object identification controller.

* * * * *